United States Patent
Kim et al.

(10) Patent No.: US 8,704,534 B2
(45) Date of Patent: Apr. 22, 2014

(54) METHOD AND APPARATUS OF TRACKING OF RESONANT IMPEDANCE IN RESONANCE POWER TRANSFER SYSTEM

(75) Inventors: Nam Yun Kim, Seoul (KR); Sang Wook Kwon, Seongnam-si (KR); Eun Seok Park, Suwon-si (KR); Young Tack Hong, Seongnam-si (KR); Young Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 419 days.

(21) Appl. No.: 13/210,717

(22) Filed: Aug. 16, 2011

(65) Prior Publication Data

US 2012/0049861 A1  Mar. 1, 2012

(30) Foreign Application Priority Data

Aug. 25, 2010 (KR) .................. 10-2010-0082235

(51) Int. Cl.
*G01R 27/04* (2006.01)
(52) U.S. Cl.
USPC ............................. 324/633; 324/637; 307/104
(58) Field of Classification Search
USPC .................... 324/633, 600, 637, 713; 307/104
See application file for complete search history.

(56) References Cited

U.S. PATENT DOCUMENTS

| | | | |
|---|---|---|---|
| 5,013,898 A | 5/1991 | Glasspool | |
| 6,571,184 B2 | 5/2003 | Anderson et al. | |
| 2008/0067874 A1 | 3/2008 | Tseng | |
| 2009/0045772 A1 | 2/2009 | Cook et al. | |
| 2010/0052811 A1 | 3/2010 | Smith et al. | |
| 2011/0235800 A1* | 9/2011 | Furukawa et al. | 380/33 |

FOREIGN PATENT DOCUMENTS

| | | |
|---|---|---|
| JP | 2000-308262 | 11/2000 |
| JP | 2002-078248 | 3/2002 |
| JP | 2007-336788 | 12/2007 |
| JP | 2009-278837 | 11/2009 |
| KR | 10-2009-0096544 | 9/2009 |

OTHER PUBLICATIONS

International Search Report mailed Mar. 14, 2012, directed to counterpart International Patent Applicaton No. PCT/KR2011/006142; 3 pages.

* cited by examiner

*Primary Examiner* — Vincent Q Nguyen
(74) *Attorney, Agent, or Firm* — NSIP Law

(57) ABSTRACT

A resonance power transfer system and a method for tracking resonant impedance in the resonance power transfer system are provided. An apparatus for tracking resonant impedance in a resonance power transfer system may include: a load sensor configured to detect the impedance of a load connected to a target device that receives resonance power; a target reflection signal detector configured to detect a reflection signal corresponding to the resonance power; a target impedance tracking unit configured to track the resonant impedance by adjusting a determination factor of a resonant frequency; and a target control unit configured to control the tracking of the resonant impedance based on whether there is a change of the impedance of the load, the reflection signal is detected, or both.

18 Claims, 21 Drawing Sheets

METHOD AND APPARATUS OF TRACKING OF RESONANT IMPEDANCE IN RESONANCE POWER TRANSFER SYSTEM

CROSS-REFERENCE TO RELATED APPLICATION(S)

This application claims the benefit under 35 U.S.C. §119(a) of Korean Patent Application No. 10-2010-0082235, filed on Aug. 25, 2010, in the Korean Intellectual Property Office, the entire disclosure of which is incorporated herein by reference for all purposes.

BACKGROUND

1. Field

The following description relates to wireless power transfer.

2. Description of Related Art

Conventional wireless power transmission systems may include a source resonator for transmitting a resonance power and a target resonator for receiving the resonance power. The resonance power may be wirelessly transferred from the source device to the target device.

Due to the nature of a wireless environment, the distance between the source resonator and the target resonator may likely vary over time, and a matching condition of both resonators may change.

SUMMARY

According to an aspect, an apparatus for tracking resonant impedance in a resonance power transfer system may include: a load sensor configured to detect the impedance of a load connected to a target device that receives resonance power; a target reflection signal detector configured to detect a reflection signal corresponding to the resonance power; a target impedance tracking unit configured to track the resonant impedance by adjusting a determination factor of a resonant frequency; and a target control unit configured to control the tracking of the resonant impedance based on whether there is a change of the impedance of the load, the reflection signal is detected, or both.

The load sensor may detect the change of the impedance of the load by sensing a voltage applied to the load and an amount of current-flowing to the load.

The target reflection signal detector may detect the reflection signal through a coupler.

The target impedance tracking unit may include one or more capacitors and a switch configured to adjust the determination factor of the resonant frequency by switching the one or more capacitors.

The target control unit may acquire an amount of the change of the impedance of the load, and determines a switching direction of the switch based on the amount of the change of the impedance.

According to another aspect, an apparatus for tracking resonant impedance in a resonance power transfer system may include: a source reflection signal detector configured to detect a reflection signal corresponding to resonance power transmitted to a target device; a target detector configured to detect a change of impedance with respect to the target device; a source impedance tracking unit configured to track of resonant impedance by adjusting a determination factor of resonant frequency; and a source control unit configured to control the tracking of the resonant impedance based on whether at least one of the reflection signal and the change of the impedance with respect to the target device is detected.

The source reflection signal detector may detect the reflection signal through a coupler.

The target detector may detect the change of the impedance with respect to the target device based on the reflection signal and an amount of the resonance power transmitted to the target device.

The source impedance tracking unit may include one or more capacitors and a switch configured to adjust the determination factor of the resonant frequency by switching the one or more capacitors.

The source control unit may acquire an amount of the change of the impedance with respect to the target device, and determines a switching direction of the switch based on the amount of the change of the impedance.

According to yet another aspect, a method of tracking resonant impedance of a target device in a resonance power transfer system may include: detecting an impedance of a load connected to the target device receiving resonance power and a change of the impedance of the load; performing tracking of resonant impedance based on whether the change of the impedance is detected and an amount of the change of the impedance; and controlling the tracking of the resonant impedance based on whether a reflection signal corresponding to the resonance power is detected.

Detecting of the change of the impedance of the load may include detecting the change of the impedance of the load by detecting a voltage applied to the load and an amount of current flowing to the load.

Performing of the tracking of the resonant impedance may include: generating a control signal associated with the amount of the change of the impedance; and changing a determination factor of a resonant frequency based on the control signal.

The determination factor of the resonant frequency may correspond to a capacitance of a target resonator, and the control signal corresponds to information about an increase or a decrease of the capacitance.

According to a further aspect, a method of tracking resonant impedance of a source device in a resonance power transfer system may include: detecting a change of impedance with respect to a target device that receives resonance power; performing tracking of a resonant impedance based on whether the change of the impedance with respect to the target device is detected and an amount of the change of the impedance; and controlling tracking of the resonant impedance based on whether a reflection signal corresponding to the resonance power is detected.

The change of the impedance with respect to the target device may be detected based on the reflection signal and an amount of the resonance power transmitted to the target device.

Performing of tracking of the resonant impedance may include: generating a control signal associated with the amount of the change of the impedance; and changing a determination factor of a resonant frequency based on the control signal.

The determination factor of the resonant frequency may correspond to a capacitance of a target resonator, and the control signal corresponds to information about an increase or a decrease of the capacitance.

Other features and aspects will be apparent from the following detailed description, the drawings, and the claims.

BRIEF DESCRIPTION OF THE DRAWINGS

Throughout the drawings and the detailed description, unless otherwise described, like drawing reference numerals will be understood to refer to like elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
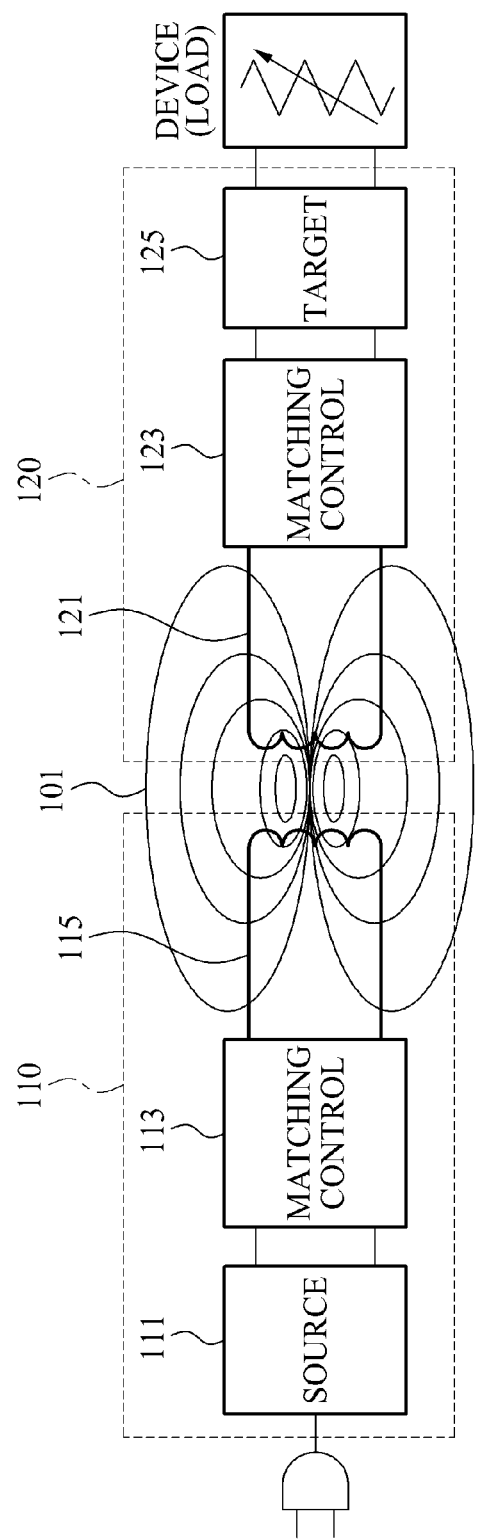
FIG. 1 illustrates a wireless power transmission system.

FIG. 1 illustrates a wireless power transmission system. In one or more embodiments, wireless power transmitted may be resonance power.

As shown in FIG. 1, the wireless power transmission system may have a source-target structure including a source and a target. For example, the wireless power transmission system may include a resonance power transmitter 110 corresponding to the source and a resonance power receiver 120 corresponding to the target.

The resonance power transmitter 110 may include a source unit 111 and a source resonator 115. The source unit 111 may be configured to receive energy from an external voltage supplier to generate a resonance power. In some instances, the resonance power transmitter 110 may further include a matching control 113 to perform resonant frequency, impedance matching, or both.

The source unit 111 may include an alternating current (AC)-to-AC (AC/AC) converter, an AC-to-direct current (DC) (AC/DC) converter, and/or a (DC/AC) inverter. The AC/AC converter may be configured to adjust, to a desired level, a signal level of an AC signal input from an external device. And the AC/DC converter may output a DC voltage at a predetermined level by rectifying an AC signal output from the AC/AC converter. The DC/AC inverter may be configured to generate an AC signal (e.g., in a band of a few megahertz (MHz) to tens of MHz) by quickly switching a DC voltage output from the AC/DC converter. Other frequencies of AC power are also possible.

The matching control 113 may be configured to set at least a resonance bandwidth of the source resonator 115, an impedance matching frequency of the source resonator 115, or both. In some implementations, the matching control 113 may include at least one of a source resonance bandwidth setting unit and a source matching frequency setting unit. And the source resonance bandwidth setting unit may set the resonance bandwidth of the source resonator 115. The source matching frequency setting unit may set the impedance matching frequency of the source resonator 115. For example, a Q-factor of the source resonator 115 may be determined based on setting of the resonance bandwidth of the source resonator 115 or setting of the impedance matching frequency of the source resonator 115.

The source resonator 115 may be configured to transfer electromagnetic energy to a target resonator 121. For example, the source resonator 115 may transfer the resonance power to the resonance power receiver 120 through magnetic coupling 101 with the target resonator 121. Accordingly, the source resonator 115 may be configured to resonate within the set resonance bandwidth.

As shown, the resonance power receiver 120 may include the target resonator 121, a matching control 123 to perform resonant frequency or impedance matching, and a target unit 125 to transfer the received resonance power to a device or a load.

The target resonator 121 may be configured to receive the electromagnetic energy from the source resonator 115. The target resonator 121 may be configured to resonate within the set resonance bandwidth.

The matching control 123 may set at least one of a resonance bandwidth of the target resonator 121 and an impedance matching frequency of the target resonator 121. In some instances, the matching control 123 may include at least one of a target resonance bandwidth setting unit and a target matching frequency setting unit. The target resonance bandwidth setting unit may set the resonance bandwidth of the target resonator 121. The target matching frequency setting unit may be configured to set the impedance matching frequency of the target resonator 121. For example, a Q-factor of the target resonator 121 may be determined based on setting of the resonance bandwidth of the target resonator 121 or setting of the impedance matching frequency of the target resonator 121.

The target unit 125 may be configured to transfer the received resonance power to the load. The target unit 125 may include an AC/DC converter and a DC/DC converter. The AC/DC converter may generate a DC voltage by rectifying an AC signal transmitted from the source resonator 115 to the target resonator 121. And the DC/DC converter may supply a rated voltage to a device or the load by adjusting a voltage level of the DC voltage.

In one or more embodiments, the source resonator 115 and the target resonator 121 may be configured as a helix coil structured resonator, a spiral coil structured resonator, a meta-structured resonator, or the like.

Referring to FIG. 1, controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. The resonance bandwidth of the source resonator 115 may be set to be wider or narrower than the resonance bandwidth of the target resonator 121 in some instances. For example, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

For wireless power transmission employing a resonance scheme, the resonance bandwidth may be an important factor. When the Q-factor (e.g., considering a change in a distance between the source resonator 115 and the target resonator 121, a change in the resonant impedance, impedance mismatching, a reflected signal, and/or the like), is Qt, Qt may have an inverse-proportional relationship with the resonance bandwidth, as given by Equation 1.

$$\frac{\Delta f}{f_0} = \frac{1}{Qt}$$ [Equation 1]
$$= \Gamma_{S,D} + \frac{1}{BW_S} + \frac{1}{BW_D}$$

In Equation 1, $f_0$ denotes a central frequency, $\Delta f$ denotes a change in a bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. The BW-factor may indicate either $1/BW_S$ or $1/BW_D$.

Due to one or more external effects, for example, a change in the distance between the source resonator 115 and the target resonator 121, a change in a location of at least one of the source resonator 115 and the target resonator 121, and/or the like, impedance mismatching between the source resonator 115 and the target resonator 121 may occur. Impedance mismatching may be a direct cause in decreasing an efficiency of power transfer. When a reflected wave corresponding to a transmission signal that is partially reflected and returned is detected, the matching control 113 may be configured to determine the impedance mismatching has occurred, and may perform impedance matching. The matching control 113 may change a resonant frequency by detecting a resonance point through a waveform analysis of the reflected wave. The matching control 113 may determine, as the resonant frequency, a frequency having a minimum amplitude in the waveform of the reflected wave.

Figure 2:
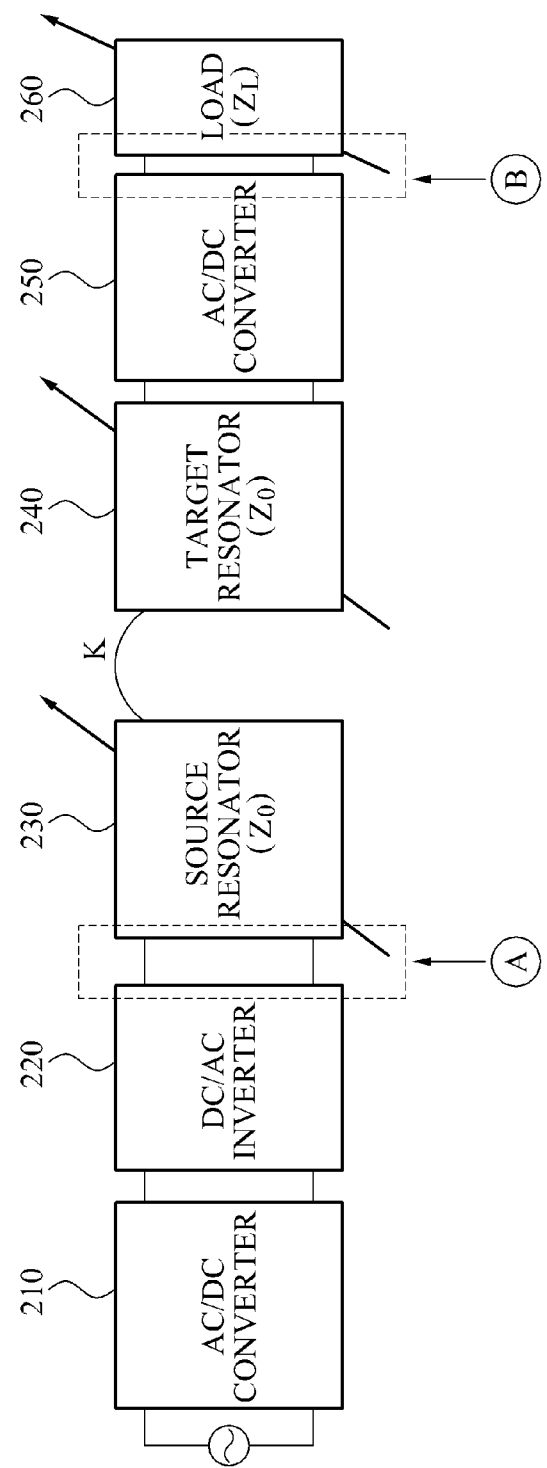
FIG. 2 illustrates a resonance power transmission system.

FIG. 2 illustrates a resonance power transmission system.

As shown, a source device of the resonance power transmission system may include an AC/DC converter 210, a DC/AC inverter 220, and a source resonator 230. A target device of the resonance power transmission system may include a target resonator 240 and an AC/DC converter 250. In FIG. 2, a load 260 may be included in the target device or may correspond to an external device.

Impedance matching, with respect to a change of an impedance $Z_L$ of the load 260, and impedance matching, with respect to a change of an impedance of the source device viewed from the target device, may be performed at a spot B. An impedance matching with respect to an impedance change between the DC/AC inverter 220 and the source resonator 230 may be performed at a spot A. Impedance matching may be performed through an impedance tracking described below. For example, a resonant impedance tracking device for tracking of a resonant frequency may be included in each of the source device and the target device, or may be included in one of the source device and the target device. The resonant impedance may indicate an impedance value when a resonator has a resonant frequency.

Figure 3:
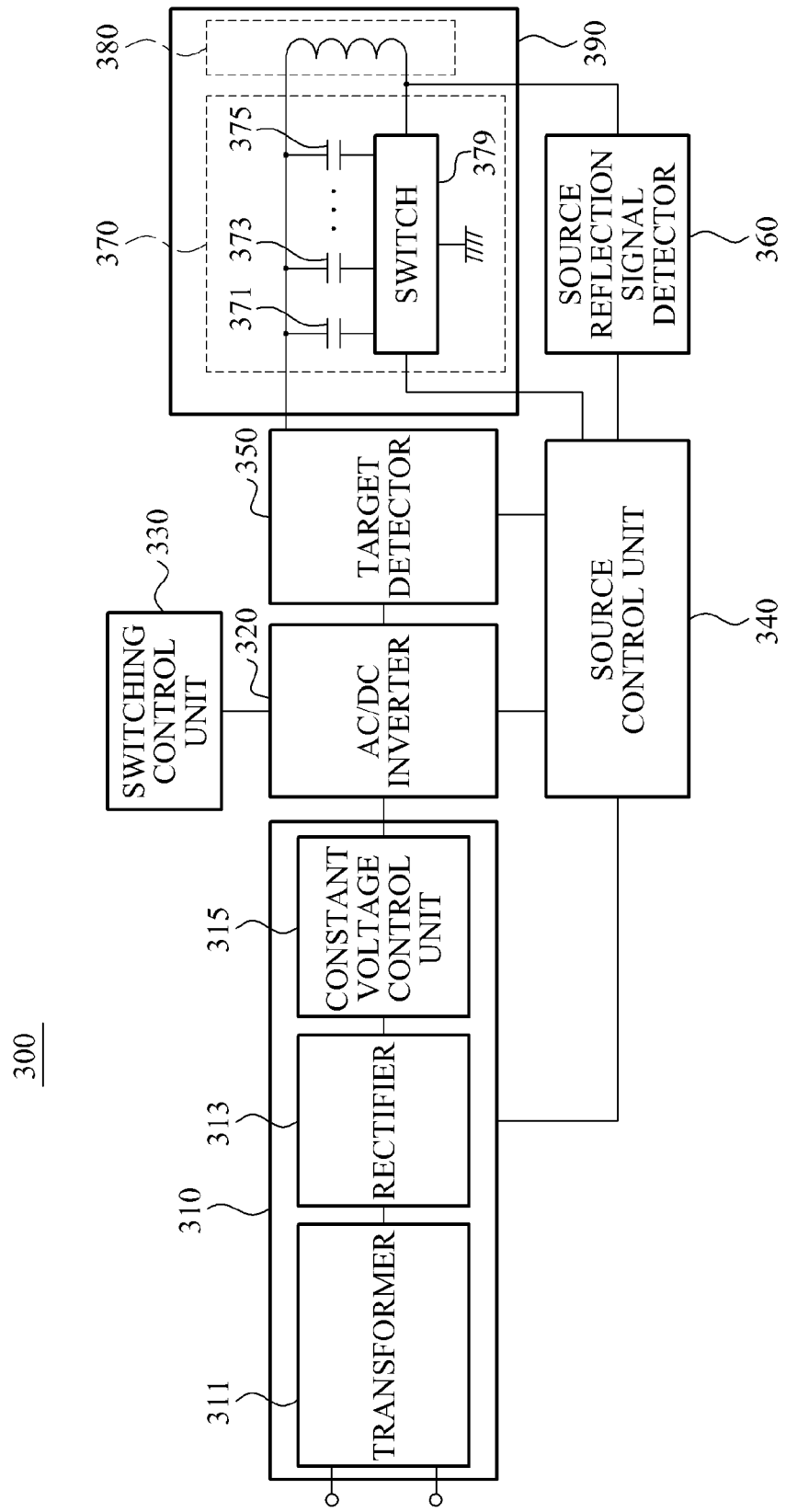
FIG. 3 illustrates one configuration of a source device.

FIG. 3 illustrates one configuration of a source device 300.

As shown, the source device 300 may include a voltage control unit 310, an AC/DC inverter 320, a switching control unit 330, a source control unit 340, a target detector 350, a source reflection signal detector 360, and a source resonance unit 390.

The voltage control unit 310 may receive an input of an AC signal of a first frequency, and may output a DC voltage. The output DC voltage may be at a constant level. For example, the first frequency may correspond to, for example, dozens of frequency bands in the Hz range. The AC signal of the first frequency may be generated, for instance, by a fast switching scheme using a fast switching device, or may be generated by an oscillation scheme using an oscillator. As shown, the voltage control unit 310 may include a transformer 311, a rectifier 313, and a constant voltage control unit 315.

The transformer 311 may adjust a signal level, of an AC signal inputted from an external device, to a predetermined level.

The rectifier 313 may rectify an AC signal outputted from the transformer 311, thereby outputting a DC signal.

The constant voltage control unit 315 may be configured to output a DC voltage at a constant level according to a control of the source control unit 340. The constant voltage control unit 315 may include a stabilizing circuit for outputting the DC voltage at a constant level. The voltage level of the DC voltage outputted from the constant voltage control unit 315 may be determined based on an amount of power used for the target device and/or a control of an amount of a resonance power.

The AC/DC inverter 320 may generate a resonance power by converting the DC signal, outputted from the voltage control unit 310, to an AC signal. The AC/DC inverter 320 may convert the DC voltage outputted from the constant voltage control unit 315 to an AC signal by a switching pulse signal of a second frequency. The AC/DC inverter 320 may include a switching device. For instance, the switching device may be configured to be turned ON when the switching pulse signal is at a "high state," (e.g., at or near its peak) and to be turned OFF when the switching pulse signal is at a "low state" (e.g., at or near its minimum). The switching control unit 330 may be used to generate a switching pulse signal. The generated switching pulse signal may then be provided to the AC/DC inverter 320. For instance, the switching pulse signal may be generated by a fast switching scheme or an oscillation scheme. The fast switching scheme may be implemented by a fast switching device, for example, a field effect transistor (FET). The oscillation scheme may be implemented by an oscillator included in the switching control unit 330. For example, the oscillator may output an AC signal having a predetermined oscillation frequency. A switching pulse signal outputted from the switching control unit 330 may have the second frequency.

Figure 5:
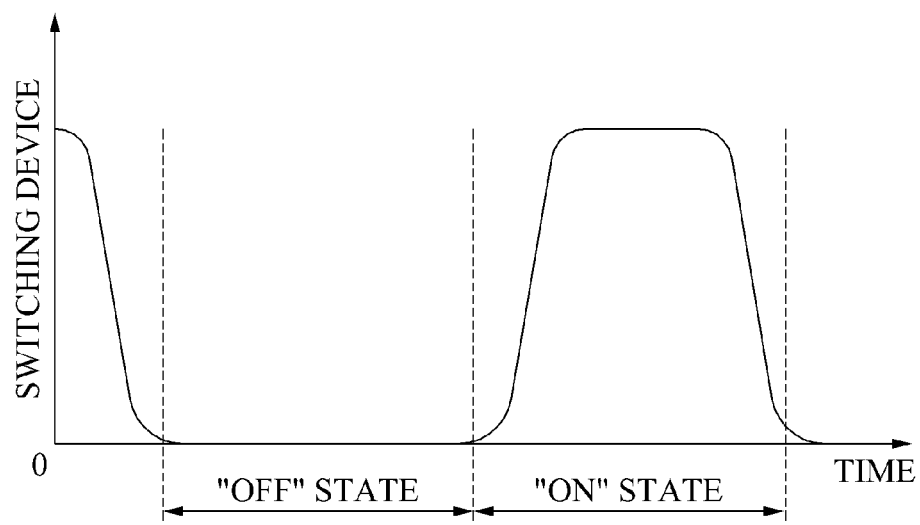
FIG. 5 illustrates a switching pulse signal.

As illustrated in FIG. 5, the switching pulse signal may correspond to a square wave. In other embodiments, the switching pulse signal may correspond to a sinusoidal wave or other waveforms.

Figure 6:
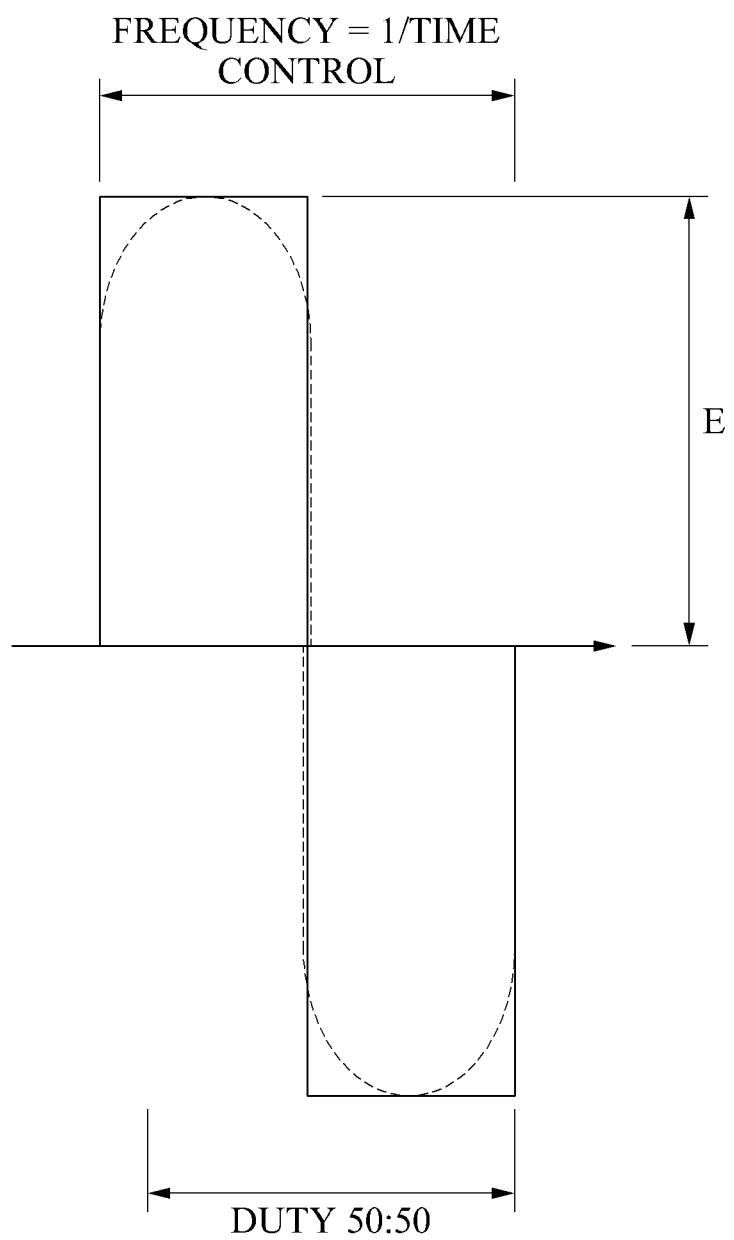
FIG. 6 illustrates a duty rate of a switching pulse signal.

FIG. 6 shows that the switching control unit 330 may control a duty rate of the switching pulse signal to be about 50:50. The second frequency may correspond to, for example, a range from several MHz to dozens of frequency bands in the MHz range. In some instance, the duty rate of the switching pulse signal may be set to have a margin around 10%. Thus, the switching control unit 330 may control the duty rate of the switching pulse signal to be 40 to 60%.

The source control unit 340 may be configured to control an overall operation of a source device, track of resonant impedance, and/or match the impedance. The source control unit 340 may include at least one processor. For example, the at least one processor included in the source control unit 340 may be configured to control the tracking of a resonant impedance.

The source control unit 340 may control the tracking of the resonant impedance based on whether at least one of the reflection signal and the change of the impedance with respect to the target device is detected. For instance, the tracking of resonant impedance may correspond to a process of adjusting the impedance performed in the source impedance tracking unit 370. The source control unit 340 may be configured to acquire an amount of the change of the impedance with respect to the target device, and control the source impedance tracking unit 370 based on the amount of the change of the impedance. The impedance with respect to the target device may indicate the impedance when viewed from a spot A to a spot B of FIG. 2. The change of the impedance with respect to the target device may be provided from the target detector 350 to the source control unit 340.

The target detector 350 may detect the change of the impedance with respect to the target device. In some implementations, the target detector 350 may detect the change of the impedance with respect to the target device based on the amount of AC power inputted from an external power source to the voltage control unit 310, the amount of output power of a source resonance unit 380, the magnitude of a reflection power corresponding to a resonance power transmitted to the target device, or any combination thereof. For example, the target detector 350 may be configured to detect the change of the impedance with respect to the target device using a ratio of the reflection power to an amount of the resonance power transmitted to the target device.

For resonance power transmission, a relational equation based on the impedance between a source resonator and a target resonator may be defined according to Equation 1.

$$V_{max} = |V_i| + |V_r| = |V_i| * (1 + |\Gamma|)$$ [Equation 1]
$$V_{min} = |V_i| - |V_r| = |V_i| * (1 - |\Gamma|)$$
$$VSWR = \frac{V_{max}}{V_{min}} = \left|\frac{V_i}{V_i}\right| \frac{*(1 + |\Gamma|)}{*(1 - |\Gamma|)} = \frac{1 + |\Gamma|}{1 - |\Gamma|}$$

In Equation 1, $V_i$ denotes an output voltage of a source side, $V_r$ denotes a reflection voltage due to an impedance mismatching, and $\Gamma$ denotes a reflection coefficient. The reflection coefficient $\Gamma$ of Equation 1 may be defined according to Equation 2.

$$\text{Reflection coefficient } (\Gamma) = \frac{V_r}{V_i} = \frac{Z_L - Z_o}{Z_L + Z_o}$$ [Equation 2]

The source reflection signal detector 360 may detect a reflection signal corresponding to a resonance power transmitted to the target device. The source reflection signal detector 360 may include a coupler for coupling a reflection signal. The source reflection signal detector 360 may detect a reflection signal through the coupler. According to an embodiment, when a reflection signal is not detected through the source reflection signal detector 360, the source control unit 340 may control a switch 379 to terminate the tracking of resonant impedance. And if a reflection signal is detected through the source reflection signal detector 360, the source control unit 340 may control the switch 379 to continue the tracking of resonant impedance.

The source resonance unit 390 may include a source impedance tracking unit 370 and a source resonance unit 380.

The source impedance tracking unit 370 may adjust a determination factor of a resonant frequency to perform the tracking of resonant impedance. The determination factor of a resonant frequency may indicate the resonant frequency defined according to Equation 3. In the equation, C denotes a capacitor value (e.g., capacitance) of a resonator and L denotes an inductance value of the resonator.

$$\text{resonant frequency} = \frac{1}{2\pi\sqrt{LC}}$$ [Equation 3]

Tracking of resonant impedance may correspond to performing an impedance matching by tracking or adjusting a C value of the resonator. In some instances, the C value of the resonator may identical or similar to the value of the resonant frequency. The source impedance tracking unit 370 may include a variable capacitor or a plurality of capacitors 371, 373, and 375 for tracking the C value of the resonator. The source impedance tracking unit 370 may further include the switch 379. The switch 379 may adjust the determination factor of the resonant frequency by successively switching the plurality of capacitors 371, 373, and 375 according to a control signal inputted from the source control unit 340. The source control unit 340 may acquire an amount of the change of the impedance with respect to the target device from the target detector 350, and may determine a switching direction of the switch 379 based on the amount of the change of the impedance. For example, the control signal may correspond to a signal for switching the switch 379 in a direction where the value C successively decreases, or in a direction where the value C successively increases.

In some embodiments, the source device 300 may further include a communication unit. The communication unit may be configured to perform in-band communication to exchange data with a target device through a resonant frequency, and out-band communication to exchange data with the target device through a frequency assigned for a data communication.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission.

According to an embodiment, the communication unit may receive an amount of change of an impedance of a load detected in the target device to provide the amount of change to the source control unit 340. The source control unit 340 may control the source impedance tracking unit 370 using the amount of change of an impedance of a load.

Figure 4:
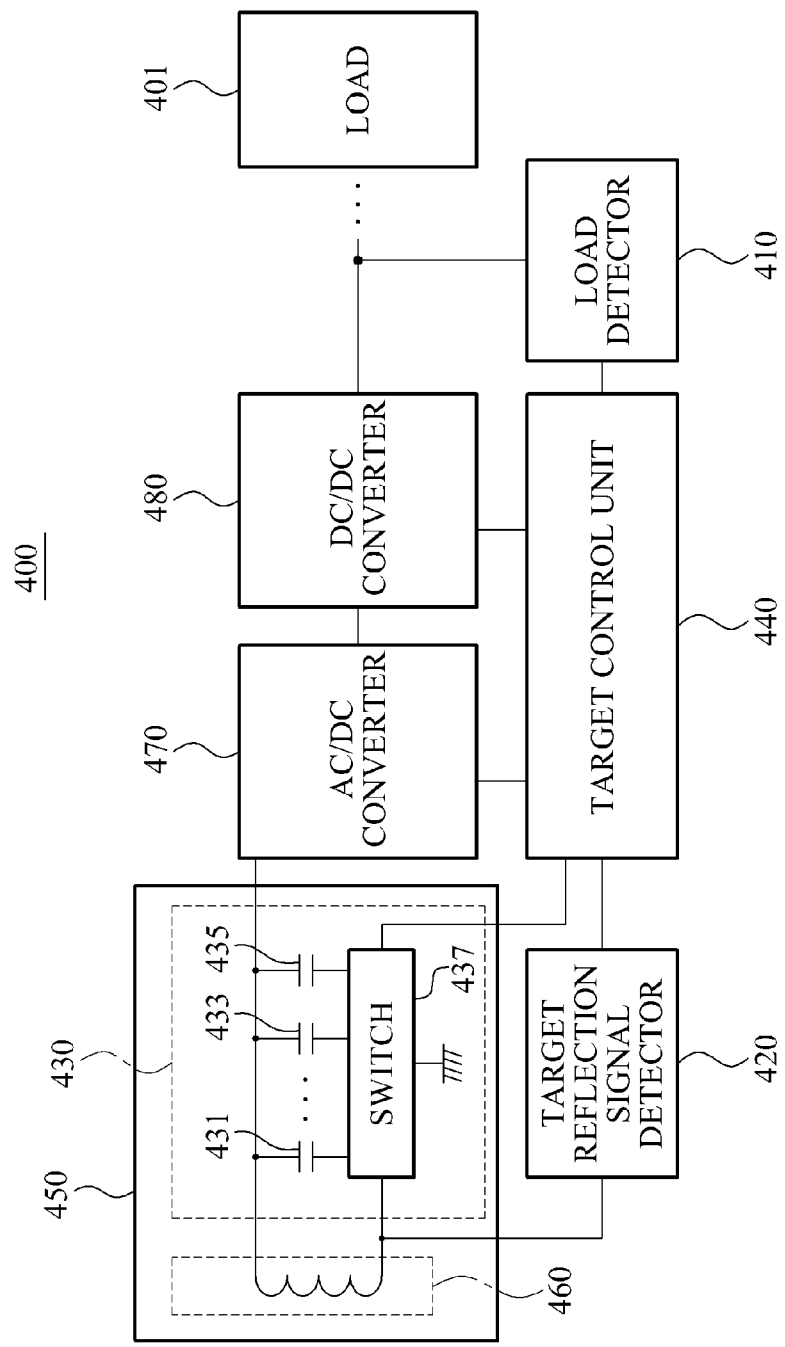
FIG. 4 illustrates one configuration of a target device.

FIG. 4 illustrates one configuration of a target device 400.

As shown, the target device 400 may include a target resonance unit 450, an AC/DC converter 470, a DC/DC converter 480, a load detector 410, a target reflection signal detector 420, and a target control unit 440. For example, in FIG. 4, a load 401 may be included in the target device 400, or may correspond to an external device.

In some embodiments, the target resonance unit 450 may be configured similar to the source resonance unit 390. The target resonance unit 450 may include a target resonator 460 and a target impedance tracking unit 430 as shown.

Target impedance tracking unit 430 may be configured to adjust a determination factor of a resonant frequency to perform a tracking of resonant impedance. Tracking of resonant impedance performed in the target impedance tracking unit 430 may correspond to a process of adjusting the impedance at the spot B of FIG. 2. The tracking of resonant impedance performed in the target impedance tracking unit 430 may be performed in a similar scheme performed in the source impedance tracking unit 370. Similar to the source impedance tracking unit 370, the target impedance tracking unit 430 may include one or more capacitors 431, 433, and 435, and a switch 437.

The AC/DC converter 470 may convert an AC voltage to a DC voltage. The AC/DC converter 470 may convert resonance power to DC power.

The DC/DC converter 480 may adjust the DC voltage, thereby providing a rated voltage to the load 401.

The load detector 410 may detect an impedance of the load 401 connected to the target device 400 receiving a resonance power and a change of the impedance of the load 401. The load detector 410 may detect a voltage applied to the load 401 and an amount of current flowing to the load 401, thereby detecting the change of the impedance of the load 401.

The target reflection signal detector 420 may detect a reflection signal corresponding to a received resonance power. The target reflection signal detector 420 may include a coupler for coupling a reflection signal. The target reflection signal detector 420 may detect a reflection signal through the coupler. According to an embodiment, when a reflection signal is not detected through the target reflection signal detector 420, the target control unit 440 may control a switch 437 to terminate the tracking of resonant impedance. When a reflection signal is detected through the target reflection signal detector 420, the target control unit 440 may control the switch 437 to continue the tracking of resonant impedance. The reflection signal may occur due to various reasons. For example, the impedance of the load 401 may change when a power consumption of the load 401 changes.

The target control unit 440 may be configured to control an overall operation of the target device 400, an impedance matching, and a tracking of resonant impedance. Thus, the target control unit 440 may include at least one processor. For example, the at least one processor included in the target control unit 440 may be configured to control the tracking of resonant impedance.

The target control unit 440 may control the tracking of resonant impedance based on whether at least one of the reflection signal and the change of the impedance of the load 401 is detected. The target control unit 440 may acquire an amount of the change of the impedance of the load 401, and control the target impedance tracking unit 430 based on the amount of the change of the impedance. The target control unit 440 may control switching of the switch 437 based on the amount of the change of the impedance of the load 401. For example, the target control unit 440 may shift the switch 437 in a direction where the value C successively decreases.

The target device 400 may further include a communication unit. The communication unit may perform in-band communication to exchange data with a source device at a resonant frequency, and out-band communication to exchange data with the source device through a frequency assigned for a data communication. According to an embodiment, the communication unit may transmit an amount of change, of an impedance of a load detected in the target device, to the source device.

Figure 7:
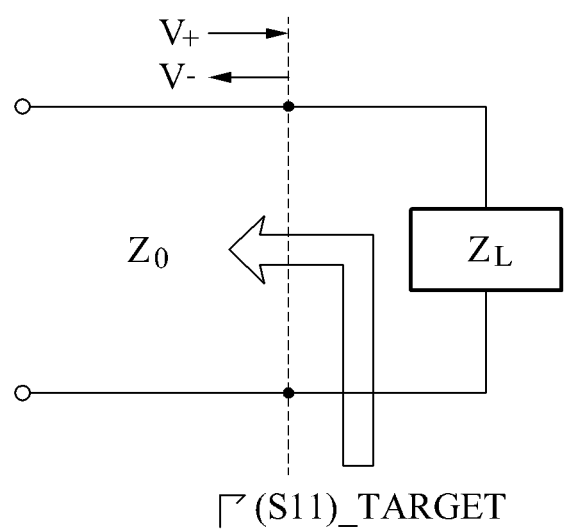
FIG. 7 illustrates performing tracking of resonant impedance by a target device in a state where a source device is fixed.

FIG. 7 illustrates performing tracking of resonant impedance by a target device in a state where a source device is fixed.

FIG. 7 equivalently illustrates impedance 4 of the source device and impedance $Z_L$ of a load. In FIG. 7, $\Gamma$ (S11)_Target denotes the reflection impedance or the reflection power of the target device with respect to the source device.

An efficiency value U in a resonance power transmission system may be defined according to Equation 4.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \quad \text{[Equation 4]}$$

In Equation 4, K denotes a coupling efficiency with respect to an energy coupling between a source resonator and a target resonator, $\Gamma_S$ denotes a reflection impedance at the source resonator, $\Gamma_D$ notes a reflection impedance at the target resonator, $\omega_0$ denotes a resonant frequency, M denotes a mutual impedance between the source resonator and the target resonator, $R_S$ denotes an impedance of the source resonator, $R_D$ denotes an impedance of the target resonator, $Q_S$ denotes a Q-factor of the source resonator, $Q_D$ denotes a Q-factor of the target resonator, $Q_K$ denotes a Q-factor with respect to the energy coupling between the source resonator and the target resonator. Referring to Equation 4, when the resonant impedance changes, an overall efficiency U may be maintained through correcting $\Gamma_S$ or $\Gamma_D$.

Figure 8:
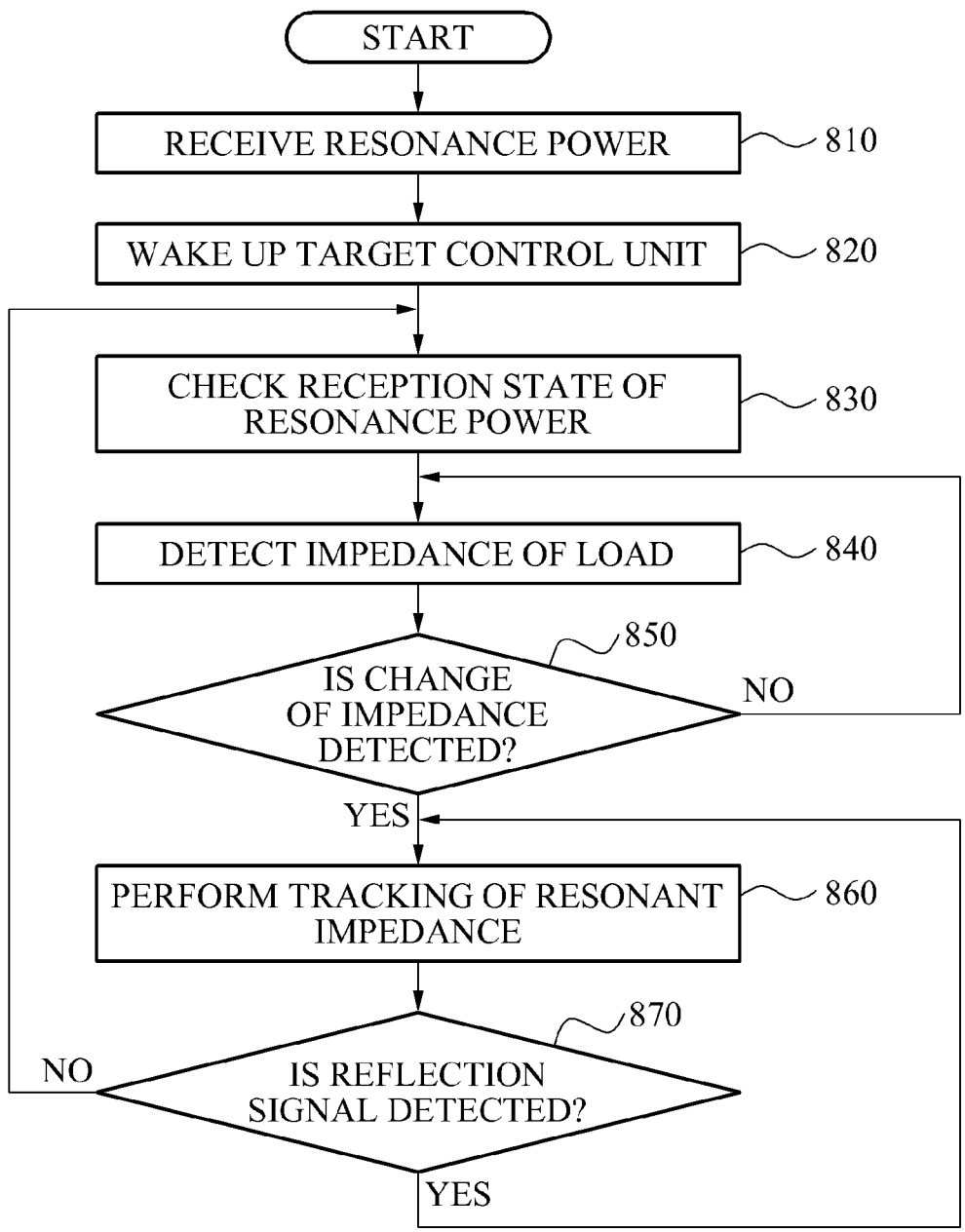
FIG. 8 illustrates a method of performing tracking of resonant impedance by a target device in a state where a source device is fixed.

FIG. 8 illustrates a method of performing tracking of resonant impedance by a target device in a state where a source device is fixed. In one or more embodiments, the method of FIG. 8 may be performed by the target device 400 (FIG. 4).

In operation 810, the target device 400 may receive resonance power from a source device. The resonance power received in operation 810 may have a relatively small amount of power capable of waking up the target control unit 440.

In operation 820, the target control unit 440 may wake up or activate the target control unit 440 using the received resonance power.

In operation 830, the target device 400 may check a reception state of the resonance power. For example, the target device 400 may verify whether an amount of the received resonance power is constant, whether the reception state is unstable, or the like.

The target device 400 may detect an impedance of a load in operation 840, and may detect a change of the impedance of the load in operation 850. The target device 400 may determine whether the change of the impedance of the load is detected in operation 850, and may perform a tracking of the resonant impedance in operation 860 when the change of the impedance of the load is detected.

In operation 860, the target device 400 may perform tracking of the resonant impedance based on whether the change of the impedance is detected and an amount of the change of the impedance. The amount of the change of the impedance may be detected by sensing a voltage applied to the load and an amount of current flowing to the load.

In operation 870, the target device 400 may control the tracking of the resonant impedance based on whether a reflection signal corresponding to the resonance power is detected.

When the reflection signal is detected, the target device 400 may return to operation 860, and control the target impedance tracking unit 430 to continue the tracking of the resonant impedance. On the other hand, if the reflection signal is not detected, the target device 400 may return to operation 830 or terminate the method of the tracking of the resonant impedance.

Operation 870 may include generating a control signal associated with the amount of the change of the impedance of the load, and successively changing a determination factor of a resonant frequency based on the control signal. The control signal associated with the amount of the change of the impedance may correspond to an order for successively changing the determination factor of the resonant frequency. The determination factor of the resonant frequency may correspond to a capacitor component of a target resonator. The control signal may correspond to information about a successive increase or decrease of the capacitor component.

Figure 9:
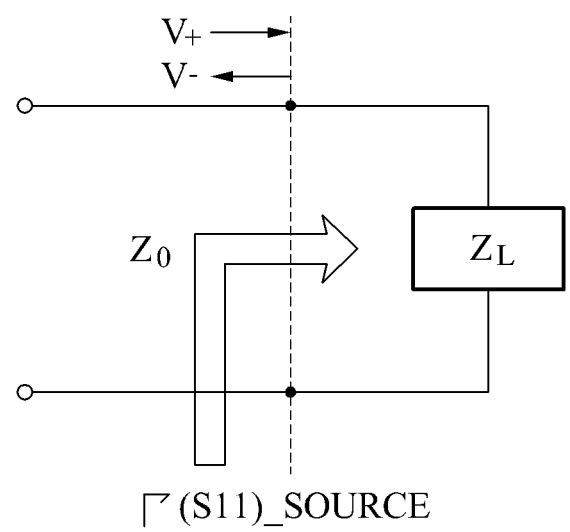
FIG. 9 illustrates performing a tracking of resonant impedance by a source device according to a change of a load.

FIG. 9 illustrates performing tracking of resonant impedance by a source device according to a change of a load.

Similar to FIG. 7, FIG. 9 equivalently illustrates impedance $Z_0$ of the source device and impedance $Z_L$ of the load. In FIG. 9, Γ (S11)_Source denotes the reflection impedance or the reflection power of the source device with respect to the target device. The source device may recognize the impedance $Z_L$ when an AC power inputted to the source device, a power conversion loss occurring during conversion to resonance power, and Γ (S11)_Source are detected. The source device may perform the tracking of resonant impedance by detecting a change of the impedance $Z_L$.

Figure 10:
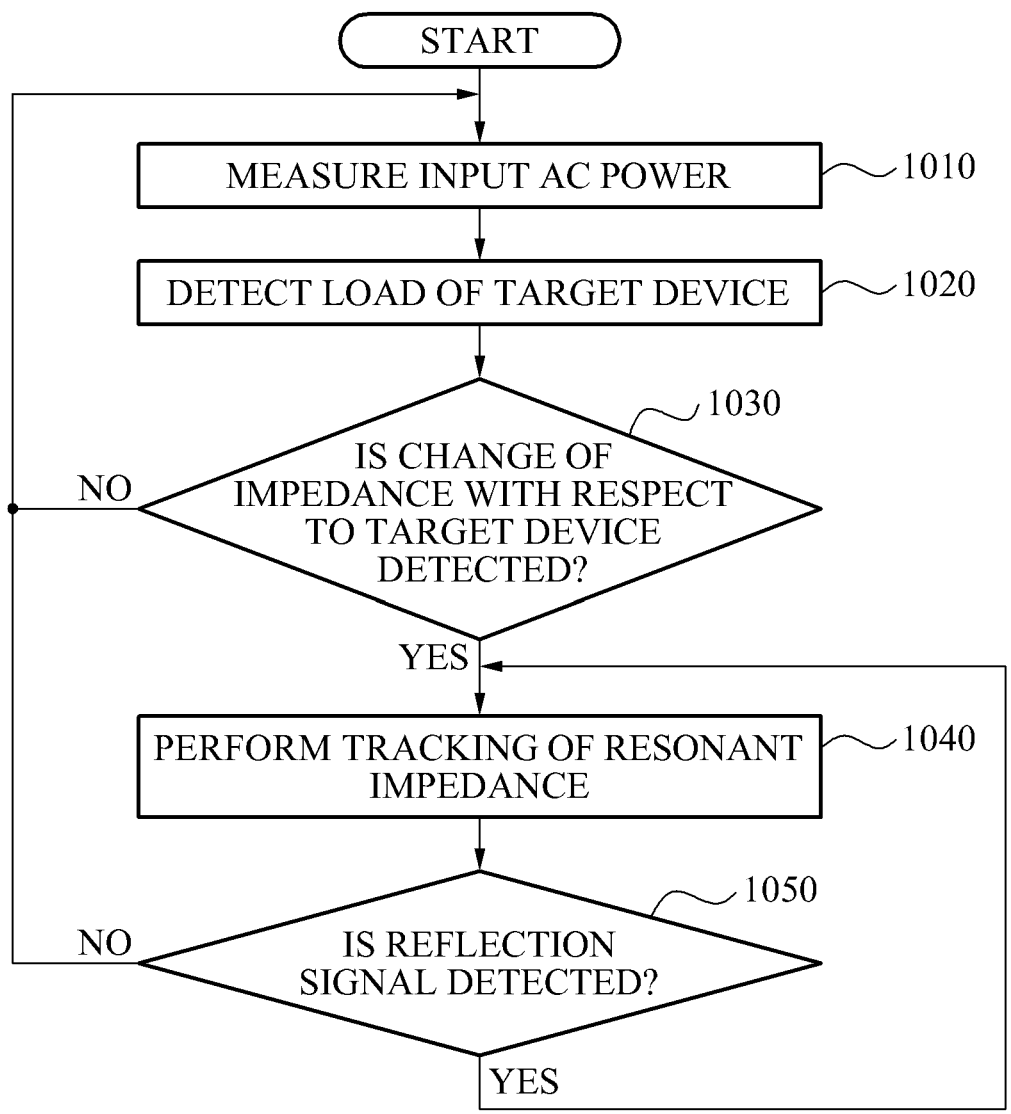
FIG. 10 illustrates a method of tracking resonant impedance performed in a source device according to a change of a load.

FIG. 10 illustrates a method of tracking of resonant impedance performed by a source device according to a change of a load. In some embodiments, the method of FIG. 10 may be performed by the source device 300 (FIG. 3).

In operation 1010, the source device 300 may measure an input AC power inputted from an external device.

In operation 1020, the source device 300 may detect a load of a target device. For example, the detecting of a load of the target device may indicate detecting a magnitude of the impedance $Z_L$ with respect to the target device of FIG. 9.

In operation 1030, the source device 300 may detect a change of the impedance with respect to the target device. The source device 300 may be configured to detect a change of the impedance with respect to the target device in operation 1030, and may perform the tracking of resonant impedance in operation 1040 when the change of the impedance with respect to the target device is detected.

In operation 1040, the source device 300 may perform tracking of the resonant impedance based on whether the change of the impedance with respect to the target device is detected and an amount of the change of the impedance with respect to the target device. The change of the impedance with respect to the target device may be detected based on an amount the resonance power transmitted to the target device and the reflection signal.

In operation 1050, the source device 300 may control the tracking of the resonant impedance based on whether a reflection signal corresponding to the resonance power is detected. When the reflection signal is detected, the source device 300 may return to operation 1040, and control the source impedance tracking unit 370 to continue the tracking of the resonant impedance. On the other hand, if no reflection signal is detected, the source device 300 may return to operation 1010 or terminate the method of the tracking of the resonant impedance.

Operation 1050 may include generating a control signal associated with the amount of the change of the impedance with respect to the target device, and successively changing a determination factor of a resonant frequency based on the control signal. The control signal associated with the amount of the change of the impedance may correspond to an order for successively changing the determination factor of the resonant frequency. The determination factor of the resonant frequency may correspond to a capacitor component of a target resonator. The control signal may correspond to information about a successive increase or decrease of the capacitor component, for instance.

Figure 11:
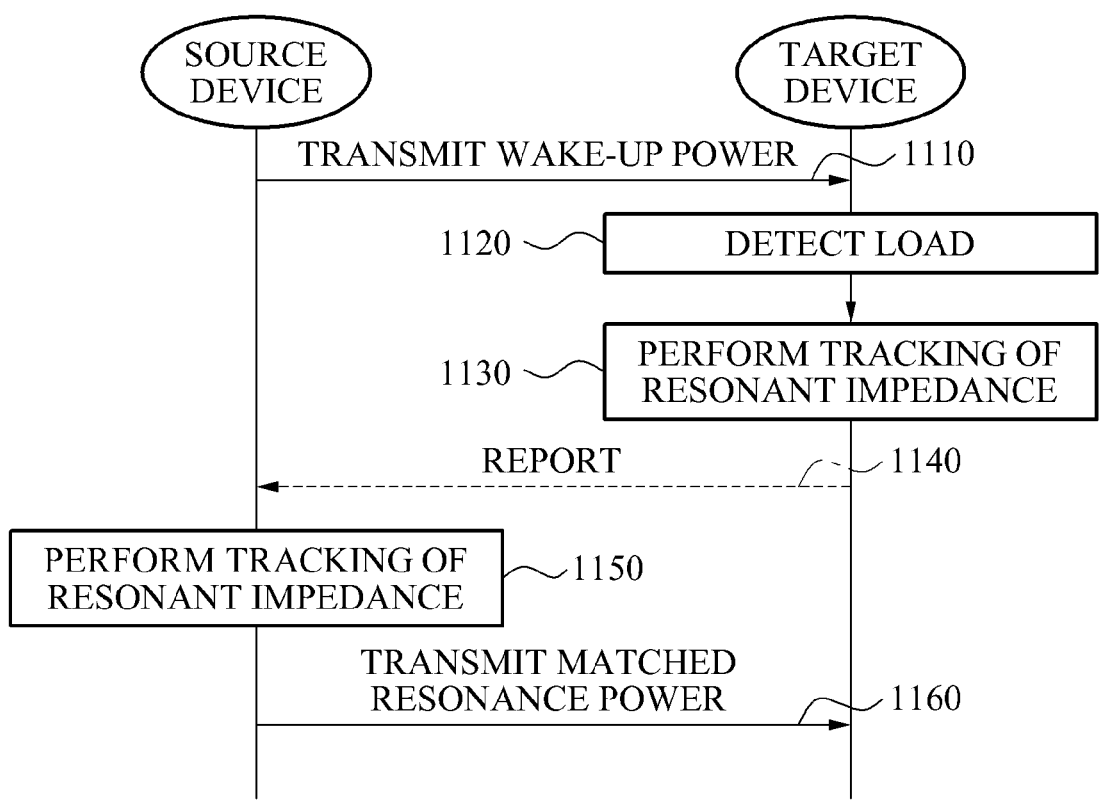
FIG. 11 illustrates a method of tracking resonant impedance between a source device and a target device according to a change of a load.

FIG. 11 illustrates performing tracking of resonant impedance between a source device and a target device according to a change of a load.

When a connection to the target device is detected, the source device may recognize $Z_L$ corresponding to a magnitude of a load with respect to the target device. In operation 1110, to recognize $Z_L$, the source device may transmit a wake-up power to the target device. The wake-up power may correspond to a power having a relatively small amount of power capable of activating a processor, and/or the like included in the target device.

In operation 1120, in response to activation by the wake-up power, the target device may perform a detection of a load. The detection of a load may indicate a detection of an impedance of the load and/or a change of the impedance of the load. In operation 1130, the target device may perform the tracking of resonant impedance. In response to termination of the tracking of the resonant impedance, the target device may transmit a report, reporting that the tracking of the resonant impedance is terminated, to the source device.

In operation 1150, in response to termination of the tracking of a resonant impedance of the target device, the source device may perform the tracking of the resonant impedance. In operation 1160, in response to termination of the tracking of the resonant impedance in the source device, an impedance-matched resonance power may be transmitted from the source device to the target device.

Figure 12:
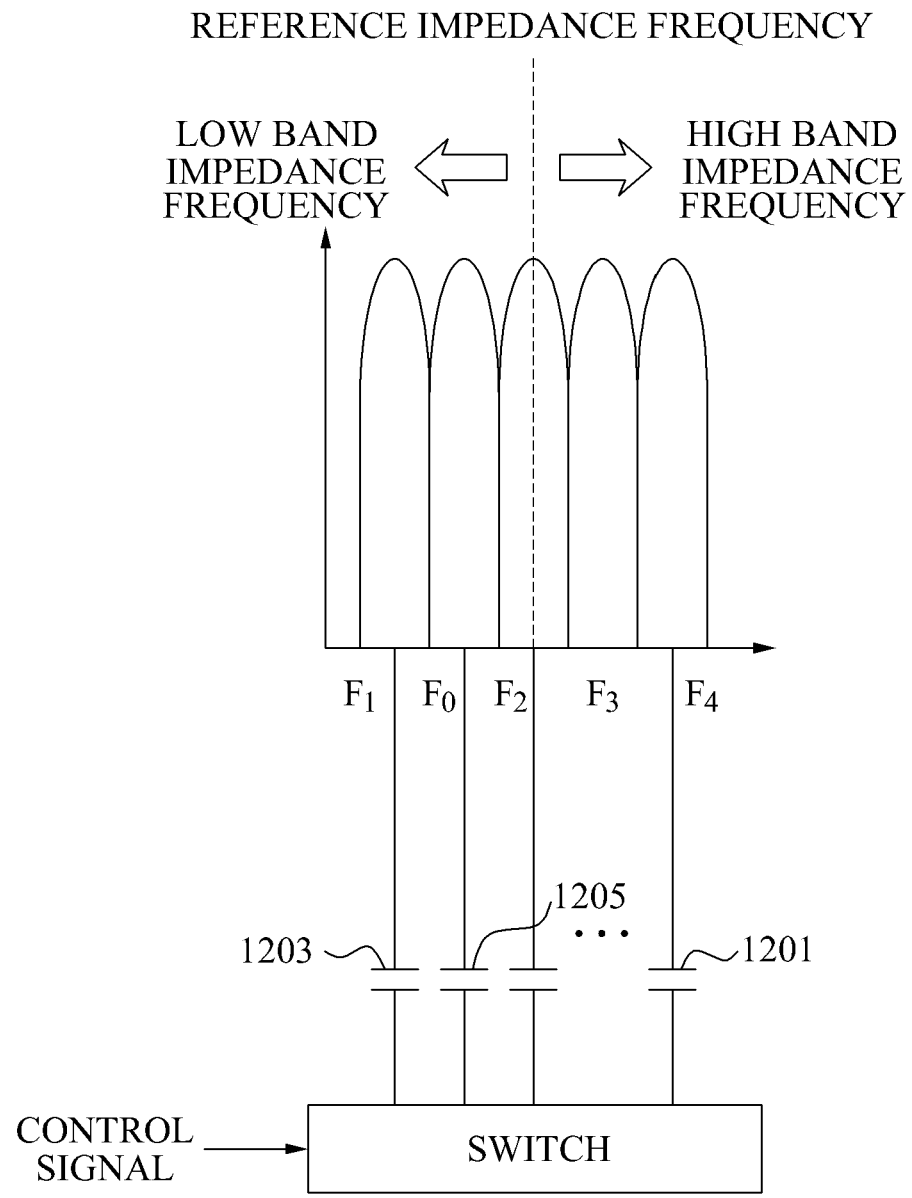
FIG. 12 illustrates a method of tracking resonant impedance.

FIG. 12 illustrates a method of tracking of resonant impedance.

In one or more embodiments, the method illustrated in FIG. 12 may be performed by an apparatus for a tracking of resonant impedance included in a source device and/or a target device. In the description below, it has been assumed that method illustrated in FIG. 12 is performed by an apparatus for a tracking of resonant impedance included in the target device.

Referring to FIG. 12, a control signal may correspond to information associated with a switching direction of a switch. The control signal may correspond to a signal for switching the switch ON and OFF with respect to a predetermined capacitor.

In FIG. 12, one or more of the plurality of capacitors 1201, 1203, and 1205 may be determined to have different capacitance (C) values corresponding to frequency offsets. In FIG. 12, the C values of the plurality of capacitors 1201, 1203, and 1205 may be assumed to be 1201, 1203, and 1205, respectively.

For example, $F_2$ corresponding to a reference impedance frequency may be assumed to be a current resonant frequency. When a load connected to the target device or a power consumption changes, an impedance mismatching may occur. In response to a detection of a change of the load, the target control unit may generate a control signal for the tracking of resonant impedance. The target control unit may determine whether the tracking of the resonant impedance is performed in a direction of a high band or in a direction of a low band. When the tracking of the resonant impedance is performed in a direction of a high band, a switching of the switch may be successively performed from $F_2$ to $F_4$, for instance. When the resonant impedance is adjusted in a direction of a high band due to a change of impedance of the load, the target control unit may control the switch to be switched from $F_2$ to $F_4$.

Referring again to FIG. 1, the source resonator 115 and/or a target resonator 121 of the wireless power transmission system may be configured as a helix coil structured resonator, a spiral coil structured resonator, a meta-structured resonator, and/or the like.

One or more of the materials of the resonator embodiments disclosed herein may be metamaterials.

An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus; the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

The magnetic permeability may indicate a ratio between a magnetic flux density occurring with respect to a given magnetic field in a corresponding material and a magnetic flux density occurring with respect to the given magnetic field in a vacuum state. The magnetic permeability and the permittivity, in some embodiments, may be used to determine a propagation constant of a corresponding material in a given frequency or a given wavelength. An electromagnetic characteristic of the corresponding material may be determined based on the magnetic permeability and the permittivity. According to an aspect, the metamaterial may be easily disposed in a resonance state without significant material size changes. This may be practical for a relatively large wavelength area or a relatively low frequency area, for instance.

Figure 13:
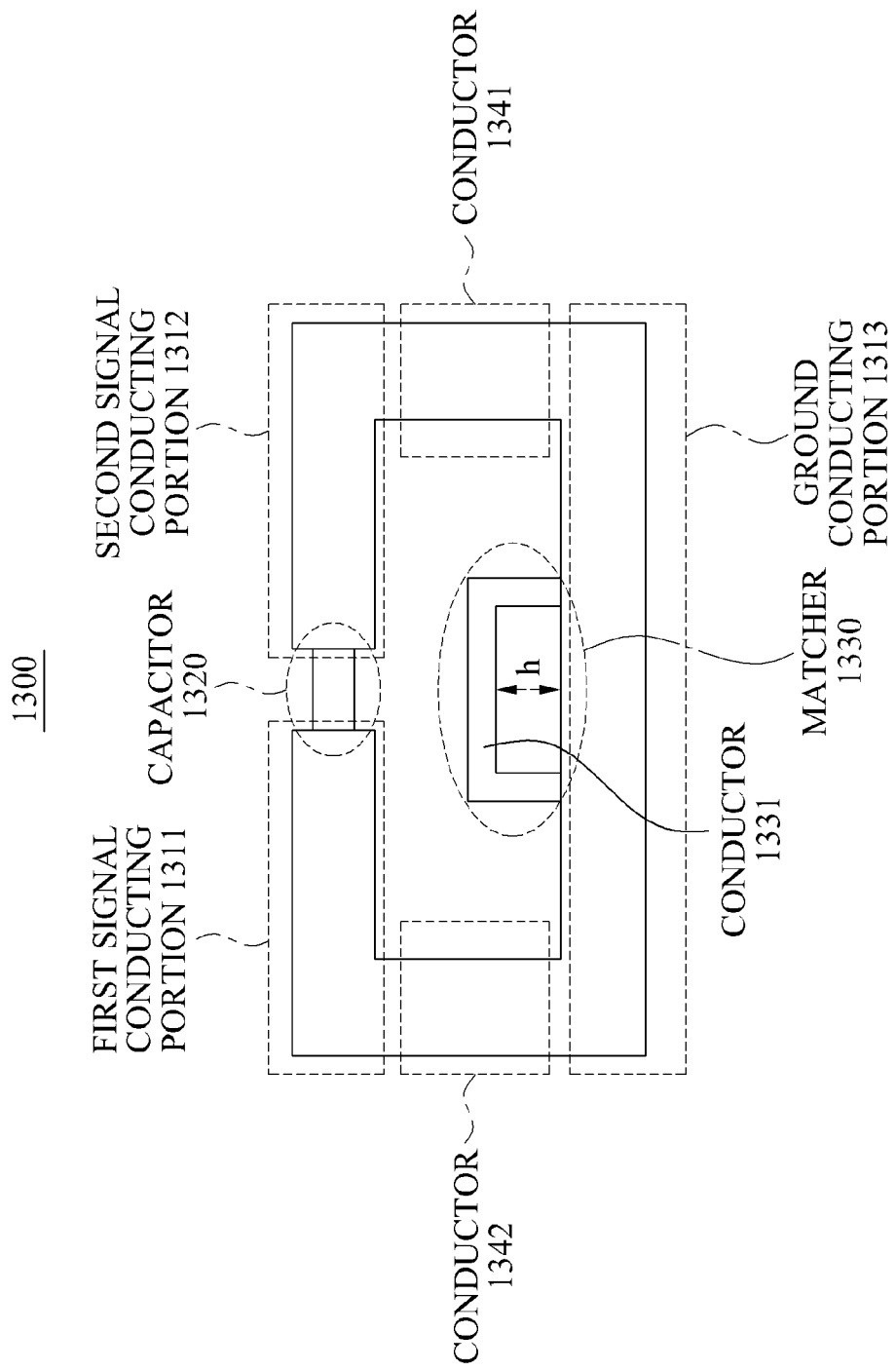
FIG. 13 through FIG. 19 illustrates various resonators.

FIG. 13 illustrates a resonator 1300 having a two-dimensional (2D) structure.

As shown, the resonator 1300 having the 2D structure may include a transmission line, a capacitor 1320, a matcher 1330, and conductors 1341 and 1342. The transmission line may include, for instance, a first signal conducting portion 1311, a second signal conducting portion 1312, and a ground conducting portion 1313.

The capacitor 1320 may be inserted or otherwise positioned in series between the first signal conducting portion 1311 and the second signal conducting portion 1312 so that an electric field may be confined within the capacitor 1320. In various implementations, the transmission line may include at least one conductor in an upper portion of the transmission line, and may also include at least one conductor in a lower portion of the transmission line. Current may flow through the at least one conductor disposed in the upper portion of the transmission line and the at least one conductor disposed in the lower portion of the transmission may be electrically grounded As shown in FIG. 13, the resonator 1300 may be configured to have a generally 2D structure. The transmission line may include the first signal conducting portion 1311 and the second signal conducting portion 1312 in the upper portion of the transmission line, and may include the ground conducting portion 1313 in the lower portion of the transmission line. As shown, the first signal conducting portion 1311 and the second signal conducting portion 1312 may be disposed to face the ground conducting portion 1313 with current flowing through the first signal conducting portion 1311 and the second signal conducting portion 1312.

In some implementations, one end of the first signal conducting portion 1311 may be electrically connected (i.e., shorted) to the conductor 1342, and another end of the first signal conducting portion 1311 may be connected to the capacitor 1320. And one end of the second signal conducting portion 1312 may be grounded to the conductor 1341, and another end of the second signal conducting portion 1312 may be connected to the capacitor 1320. Accordingly, the first signal conducting portion 1311, the second signal conducting portion 1312, the ground conducting portion 1313, and the conductors 1341 and 1342 may be connected to each other such that the resonator 1300 may have an electrically "closed-loop structure." The term "closed-loop structure" as used herein, may include a polygonal structure, for example, a circular structure, a rectangular structure, or the like that is electrically closed.

The capacitor 1320 may be inserted into an intermediate portion of the transmission line. For example, the capacitor 1320 may be inserted into a space between the first signal conducting portion 1311 and the second signal conducting portion 1312. The capacitor 1320 may be configured, in some instances, as a lumped element, a distributed element, or the like. In one implementation, a distributed capacitor may be configured as a distributed element and may include zigzagged conductor dines and a dielectric material having a relatively high permittivity between the zigzagged conductor lines.

When the capacitor 1320 is inserted into the transmission line, the resonator 1300 may have a property of a metamaterial, as discussed above. For example, the resonator 1300 may have a negative magnetic permeability due to the capacitance of the capacitor 1320. If so, the resonator 1300 may also be referred to as a mu negative (MNG) resonator. Various criteria may be applied to determine the capacitance of the capacitor 1320. For example, the various criteria for enabling the resonator 1300 to have the characteristic of the metamaterial may include one or more of the following: a criterion for enabling the resonator 1300 to have a negative magnetic permeability in a target frequency, a criterion for enabling the resonator 1300 to have a zeroth order resonance characteristic in the target frequency, or the like. The resonator 1300 may also have a zeroth order resonance characteristic (i.e., having, as a resonant frequency, a frequency when a propagation constant is "0"). If the resonator 1300 has a zeroth order resonance characteristic, the resonant frequency may be independent with respect to a physical size of the MNG resonator 1300. Moreover, by appropriately designing the capacitor 1320, the MNG resonator 1300 may sufficiently change the resonant frequency without substantially changing the physical size of the MNG resonator 1300.

In a near field, for instance, the electric field may be concentrated on the capacitor 1320 inserted into the transmission line. Accordingly, due to the capacitor 1320, the magnetic field may become dominant in the near field. In one or more embodiments, the MNG resonator 1300 may have a relatively high Q-factor using the capacitor 1320 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 1300 may include a matcher 1330 for impedance matching. For example, the matcher 1330 may be configured to appropriately determine and adjust the strength of a magnetic field of the MNG resonator 1300, for instance. Depending on the configuration, current may flow in the MNG resonator 1300 via a connector, or may flow out from the MNG resonator 1300 via the connector. The connector may be connected to the ground conducting portion 1313 or the matcher 1330. In some instances, power may be transferred through coupling without using a physical connection between the connector and the ground conducting portion 1313 or the matcher 1330.

As shown in FIG. 13, the matcher 1330 may be positioned within the loop formed by the loop structure of the resonator 1300. The matcher 1330 may adjust the impedance of the resonator 1300 by changing the physical shape of the matcher 1330. For example, the matcher 1330 may include the conductor 1331 for the impedance matching positioned in a location that is separate from the ground conducting portion 1313 by a distance h. Accordingly, the impedance of the resonator 1300 may be changed by adjusting the distance h.

In some instances, a controller may be provided to control the matcher 1330 which generates and transmits a control signal to the matcher 1330 directing the matcher to change its physical shape so that the impedance of the resonator may be adjusted. For example, the distance h between the conductor 1331 of the matcher 1330 and the ground conducting portion 1313 may be increased or decreased based on the control signal. The controller may generate the control signal based on various factors.

As shown in FIG. 13, the matcher 1330 may be configured as a passive element such as the conductor 1331, for example. Of course, in other embodiments, the matcher 1330 may be configured as an active element such as a diode, a transistor, or the like. If the active element is included in the matcher 1330, the active element may be driven based on the control signal generated by the controller, and the impedance of the resonator 1300 may be adjusted based on the control signal. For example, when the active element is a diode included in the matcher 1330, the impedance of the resonator 1300 may be adjusted depending on whether the diode is in an ON state or in an OFF state.

In some instances, a magnetic core may be further provided to pass through the MNG resonator 1300. The magnetic core may perform a function of increasing a power transmission distance.

In some instances, the capacitor 1320 may be connected to the source impedance tracking unit 370 of FIG. 3 or the target impedance tracking unit 430 of FIG. 4. For example, the capacitor 1320 may be connected to the capacitor 431 in parallel. The source impedance tracking unit 370 of FIG. 3 or the target impedance tracking unit 430 of FIG. 4 may be connected to the capacitor 1320 in various forms capable of adjusting a $C_L$ value of the resonator 1300.

Figure 14:
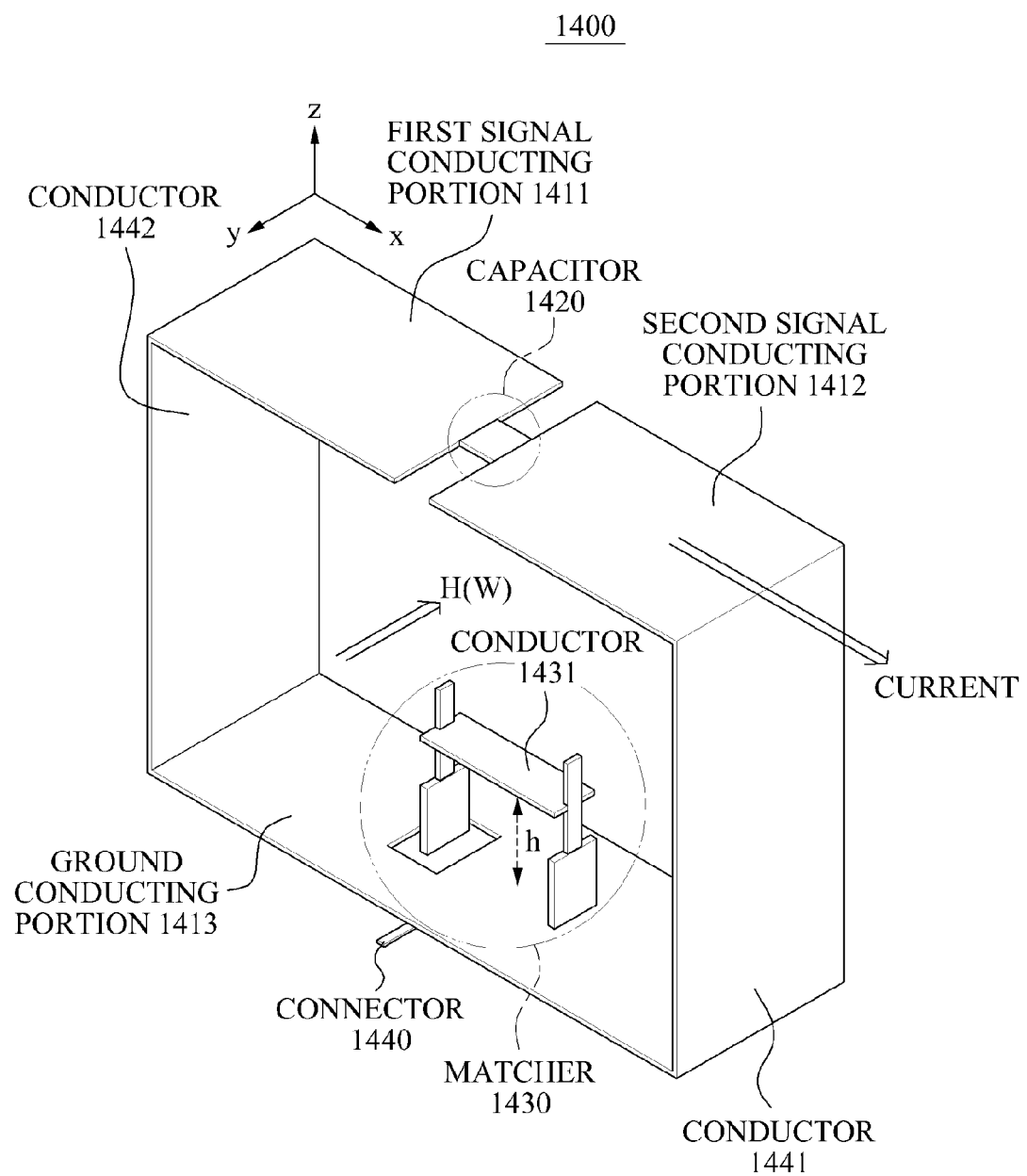

FIG. 14 illustrates a resonator 1400 having a three-dimensional (3D) structure.

Referring to FIG. 14, the resonator 1400 having the 3D structure may include a transmission line and a capacitor 1420. The transmission line may include a first signal conducting portion 1411, a second signal conducting portion 1412, and a ground conducting portion 1413. The capacitor 1420 may be inserted, for instance, in series between the first signal conducting portion 1411 and the second signal conducting portion 1412 of the transmission link such that an electric field may be confined within the capacitor 1420.

As shown in FIG. 14, the resonator 1400 may have a generally 3D structure. The transmission line may include the first signal conducting portion 1411 and the second signal conducting portion 1412 in an upper portion of the resonator 1400, and may include the ground conducting portion 1413 in a lower portion of the resonator 1400. The first signal conducting portion 1411 and the second signal conducting portion 1412 may be disposed to face the ground conducting portion 1413. In this arrangement, current may flow in an x direction through the first signal conducting portion 1411 and the second signal conducting portion 1412. Due to the current, a magnetic field H(W) may be formed in a−y direction. However, it will be appreciated that the magnetic field H(W) might also be formed in the opposite direction (e.g., a+y direction) in other implementations.

In one or more embodiments, one end of the first signal conducting portion 1411 may be electrically connected (i.e., shorted) to the conductor 1442, and another end of the first signal conducting portion 1411 may be connected to the capacitor 1420. One end of the second signal conducting portion 1412 may be grounded to the conductor 1441, and another end of the second signal conducting portion 1412 may be connected to the capacitor 1420. Accordingly, the first signal conducting portion 1411, the second signal conducting portion 1412, the ground conducting portion 1413, and the conductors 841 and 842 may be connected to each other, whereby the resonator 1400 may have an electrically closed-loop structure.

As shown in FIG. 14, the capacitor 1420 may be inserted or otherwise positioned between the first signal conducting portion 1411 and the second signal conducting portion 1412. For example, the capacitor 1420 may be inserted into a space between the first signal conducting portion 1411 and the second signal conducting portion 1412. The capacitor 1420 may include, for example, a lumped element, a distributed element, and the like. In one implementation, a distributed capacitor having the shape of the distributed element may include zigzagged conductor lines and a dielectric material having a relatively high permittivity positioned between the zigzagged conductor lines.

When the capacitor 1420 is inserted into the transmission line, the resonator 1400 may have a property of a metamaterial, in some instances, as discussed above.

For example, when a capacitor is used as a lumped element, the resonator 1400 may have the characteristic of the metamaterial. When the resonator 1400 has a negative magnetic permeability by appropriately adjusting the capacitance of the capacitor 1420, the resonator 1400 may also be referred to as an MNG resonator. Various criteria may be applied to determine the capacitance of the capacitor 1420. For example, the various criteria may include, for instance, one or more of the following: a criterion for enabling the resonator 1400 to have the characteristic of the metamaterial, a criterion for enabling the resonator 1400 to have a negative magnetic permeability in a target frequency, a criterion enabling the resonator 1400 to have a zeroth order resonance characteristic in the target frequency, or the like. Based on at least one criterion among the aforementioned criteria, the capacitance of the capacitor 1420 may be determined.

The resonator 1400 may have a zeroth order resonance characteristic (i.e., having, as a resonant frequency, a frequency when a propagation constant is "0"). If the resonator 1400 has a zeroth order resonance characteristic, the resonant frequency may be independent with respect to a physical size of the MNG resonator 1400. Thus, by appropriately designing (or configuring) the capacitor 1420, the MNG resonator 1400 may sufficiently change the resonant frequency without substantially changing the physical size of the MNG resonator 1400.

Referring to the MNG resonator 1400 of FIG. 14, in a near field, the electric field may be concentrated on the capacitor 1420 inserted into the transmission line. Accordingly, due to the capacitor 1420, the magnetic field may become dominant in the near field. And, since the MNG resonator 1400 having the zeroth-order resonance characteristic may have characteristics similar to a magnetic dipole, the magnetic field may become dominant in the near field. A relatively small amount of the electric field formed due to the insertion of the capacitor 1420 may be concentrated on the capacitor 1420 and thus, the magnetic field may become further dominant.

Also, the MNG resonator 1400 may include a matcher 1430 for impedance matching. The matcher 1430 may be configured to appropriately adjust the strength of magnetic field of the MNG resonator 1400. The impedance of the MNG resonator 1400 may be determined by the matcher 1430. Current may flow in the MNG resonator 1400 via a connector 1440, or may flow out from the MNG resonator 1400 via the connector 1440. And the connector 1440 may be connected to the ground conducting portion 1413 or the matcher 1430.

As shown in FIG. 14, the matcher 1430 may be positioned within the loop formed by the loop structure of the resonator 1400. The matcher 1430 may be configured to adjust the impedance of the resonator 1400 by changing the physical shape of the matcher 1430. For example, the matcher 1430 may include the conductor 1431 for the impedance matching in a location separate from the ground conducting portion 1413 by a distance h. The impedance of the resonator 1400 may be changed by adjusting the distance h.

In some implementations, a controller may be provided to control the matcher 1430. In this case, the matcher 1430 may change the physical shape of the matcher 1430 based on a control signal generated by the controller. For example, the distance h between the conductor 1431 of the matcher 1430 and the ground conducting portion 1413 may be increased or decreased based on the control signal. Accordingly, the physical shape of the matcher 1430 may be changed such that the impedance of the resonator 1400 may be adjusted. The distance h between the conductor 1431 of the matcher 1430 and the ground conducting portion 1431 may be adjusted using a variety of schemes. For example, a plurality of conductors may be included in the matcher 1430 and the distance h may be adjusted by adaptively activating one of the conductors. Alternatively or additionally, the distance h may be adjusted by adjusting the physical location of the conductor 1431 up and down. For instance, the distance h may be controlled based on the control signal of the controller. The controller may generate the control signal using various factors.

As shown in FIG. 14, the matcher 1430 may be configured as a passive element such as the conductor 1431, for instance. Of course, in other embodiments, the matcher 1430 may be configured as an active element such as a diode, a transistor, or the like. When the active element is included in the matcher 1430, the active element may be driven based on the control signal generated by the controller, and the impedance of the resonator 1400 may be adjusted based on the control signal. For example, if the active element is a diode included in the matcher 1430, the impedance of the resonator 1400 may be adjusted depending on whether the diode is in an ON state or in an OFF state.

In some implementations, a magnetic core may be further provided to pass through the resonator 1400 configured as the MNG resonator. The magnetic core may perform a function of increasing a power transmission distance.

Figure 15:
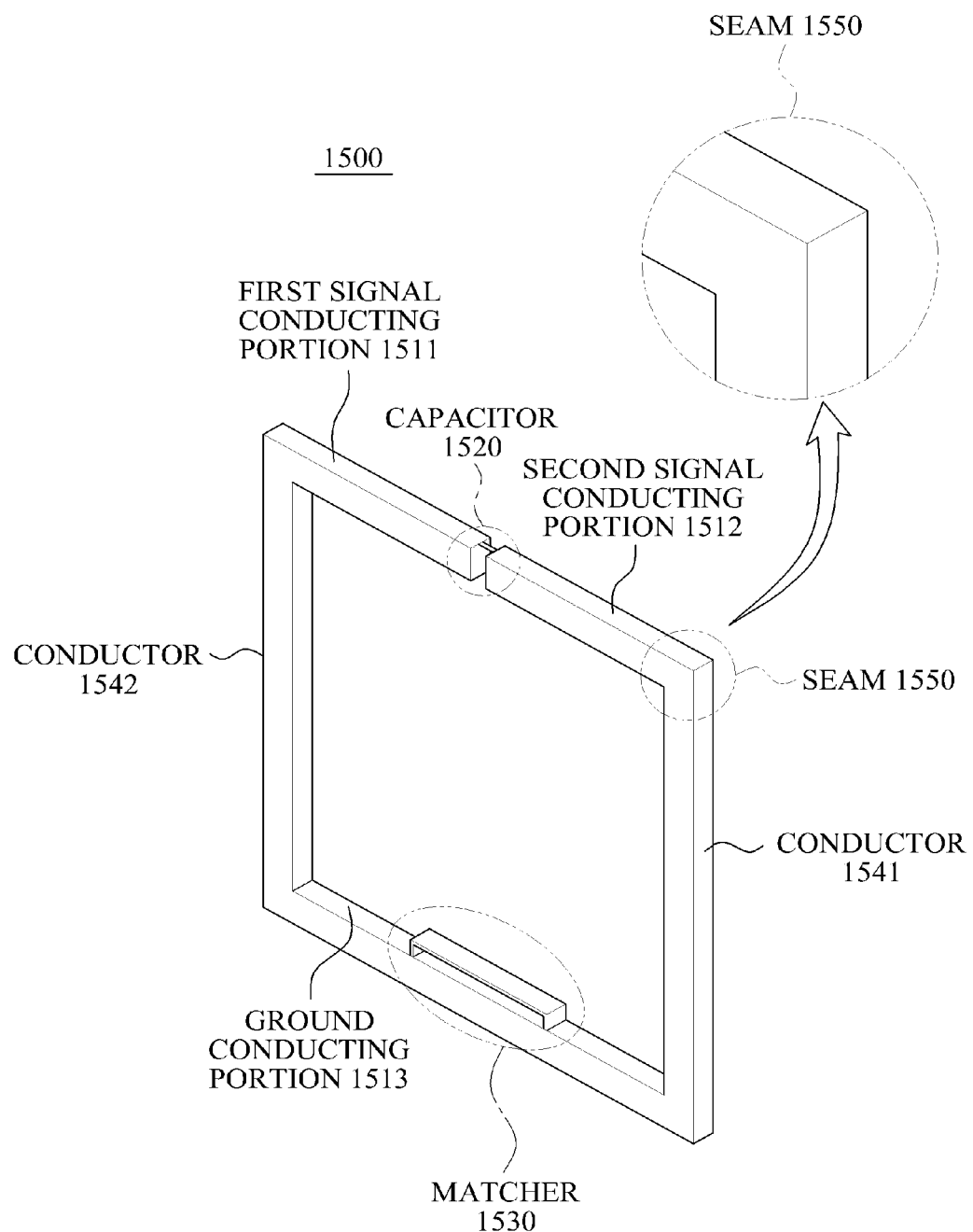

FIG. 15 illustrates a resonator 1500 for a wireless power transmission configured as a bulky type. As used herein, the term "bulky type" may refer to a seamless connection connecting at least two parts in an integrated form. Referring to FIG. 15, a first signal conducting portion 1511 and a second signal conducting portion 1512 may be integrally formed instead of being separately manufactured and thereby be connected to each other. Similarly, the second signal conducting portion 1512 and the conductor 1541 may also be integrally manufactured.

When the second signal conducting portion 1512 and the conductor 1541 are separately manufactured and then are connected to each other, a loss of conduction may occur due to a seam 1550. Thus, in some implementations, the second signal conducting portion 1512 and the conductor 1541 may be connected to each other without using a separate seam (i.e., seamlessly connected to each other). Accordingly, it is possible to decrease a conductor loss caused by the seam 1550. For instance, the second signal conducting portion 1512 and the ground conducting portion 1531 may be seamlessly and integrally manufactured. Similarly, the first signal conducting portion 1511, the conductor 1542 and the ground conducting portion 1531 may be seamlessly and integrally manufactured. A matcher 1530 may be provided that is similarly constructed as described herein in one or more embodiments.

Figure 16:
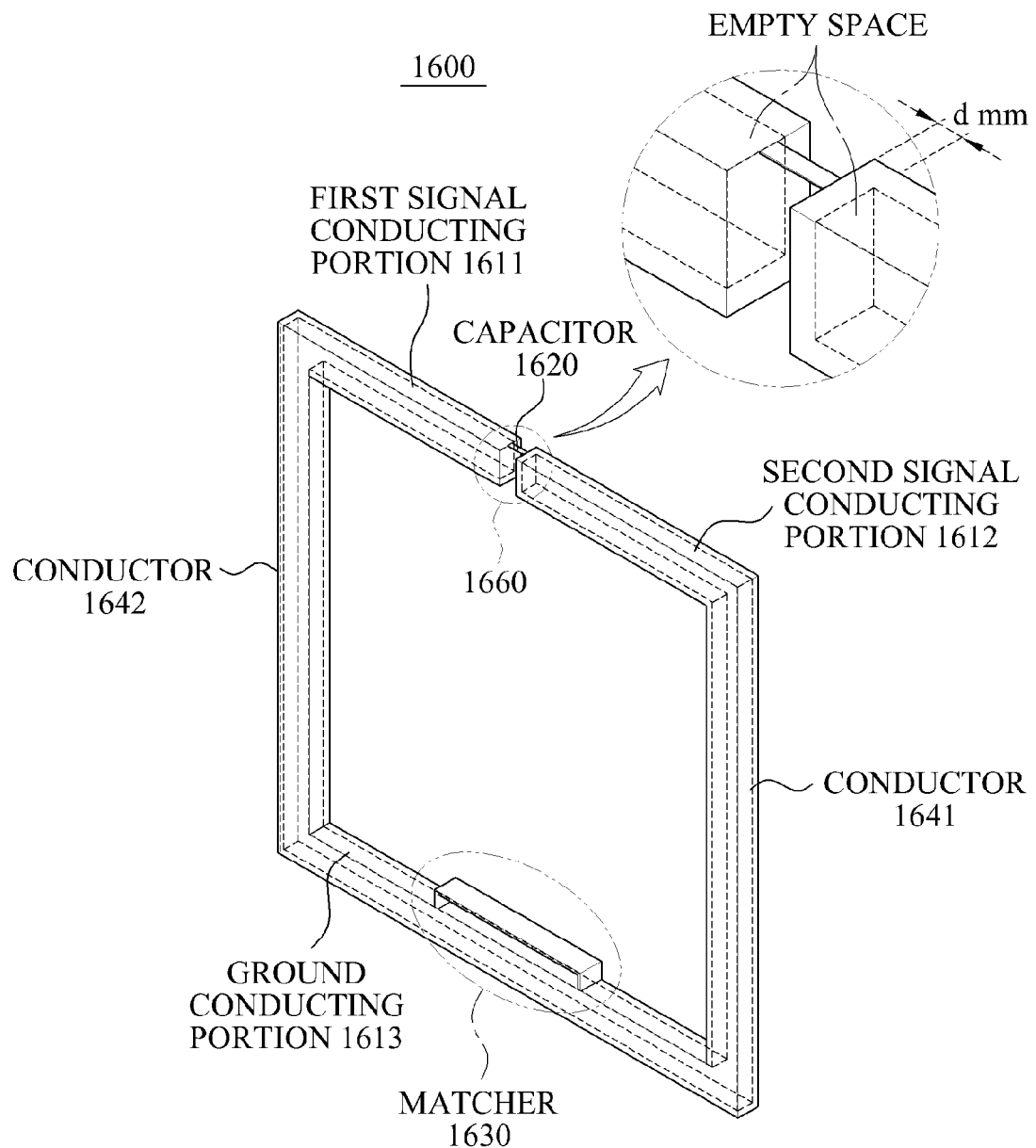

FIG. 16 illustrates a resonator 1000 for a wireless power transmission, configured as a hollow type. As used herein the term "hollow type" refers to a configuration that may include an empty space inside.

Referring to FIG. 16, each of a first signal conducting portion 1611, a second signal conducting portion 1612, a ground conducting portion 1613, and conductors 1641 and 1642 of the resonator 1600 configured as the hollow type structure.

For a given resonant frequency, an active current may be modeled to flow in only a portion of the first signal conducting portion 1611 instead of all of the first signal conducting portion 1611, a portion of the second signal conducting portion 1612 instead of all of the second signal conducting portion 1612, a portion of the ground conducting portion 1613 instead of all of the ground conducting portion 1613, and/or a portion of the conductors 1641 and 1642 instead of all of the conductors 1641 and 1642. When a depth of each of the first signal conducting portion 1611, the second signal conducting portion 1612, the ground conducting portion 1613, and the conductors 1641 and 1642 is significantly deeper than a corresponding skin depth in the given resonant frequency, it may be ineffective. The significantly deeper depth may, however, increase a weight or manufacturing costs of the resonator 1600 in some instances.

Accordingly, for the given resonant frequency, the depth of the first signal conducting portion 1611, the second signal conducting portion 1612, the ground conducting portion 1613, and the conductors 1641 and 1642 may be appropriately determined based on the corresponding skin depth of each of the first signal conducting portion 1611, the second signal conducting portion 1612, the ground conducting portion 1613, and the conductors 1641 and 1642. When the first signal conducting portion 1611, the second signal conducting portion 1612, the ground conducting portion 1613, and the conductors 1641 and 1642 has an appropriate depth deeper than a corresponding skin depth, the resonator 1600 may weigh less, and manufacturing costs of the resonator 1600 may also decrease.

For example, as shown in FIG. 16, the depth of the second signal conducting portion 1612 (as further illustrated in the enlarged view region 1660 indicated by a circle) may be determined as "d" mm and d may be determined according to $$d = \frac{1}{\sqrt{\pi f \mu \sigma}}.$$

Here, $f$ denotes a frequency, $\mu$ denotes a magnetic permeability, and $\sigma$ denotes a conductor constant. In one implementation, when the first signal conducting portion 1611, the second signal conducting portion 1612, the ground conducting portion 1613, and the conductors 1641 and 1642 are made of a copper and they may have a conductivity of $5.8 \times 10^7$ siemens per meter ($S \cdot m^{-1}$), the skin depth may be about 0.6 mm with respect to 10 kHz of the resonant frequency and the skin depth may be about 0.006 mm with respect to 100 MHz of the resonant frequency.

A capacitor 1620 and a matcher 1630 may be provided that are similarly constructed as described herein in one or more embodiments.

Figure 17:
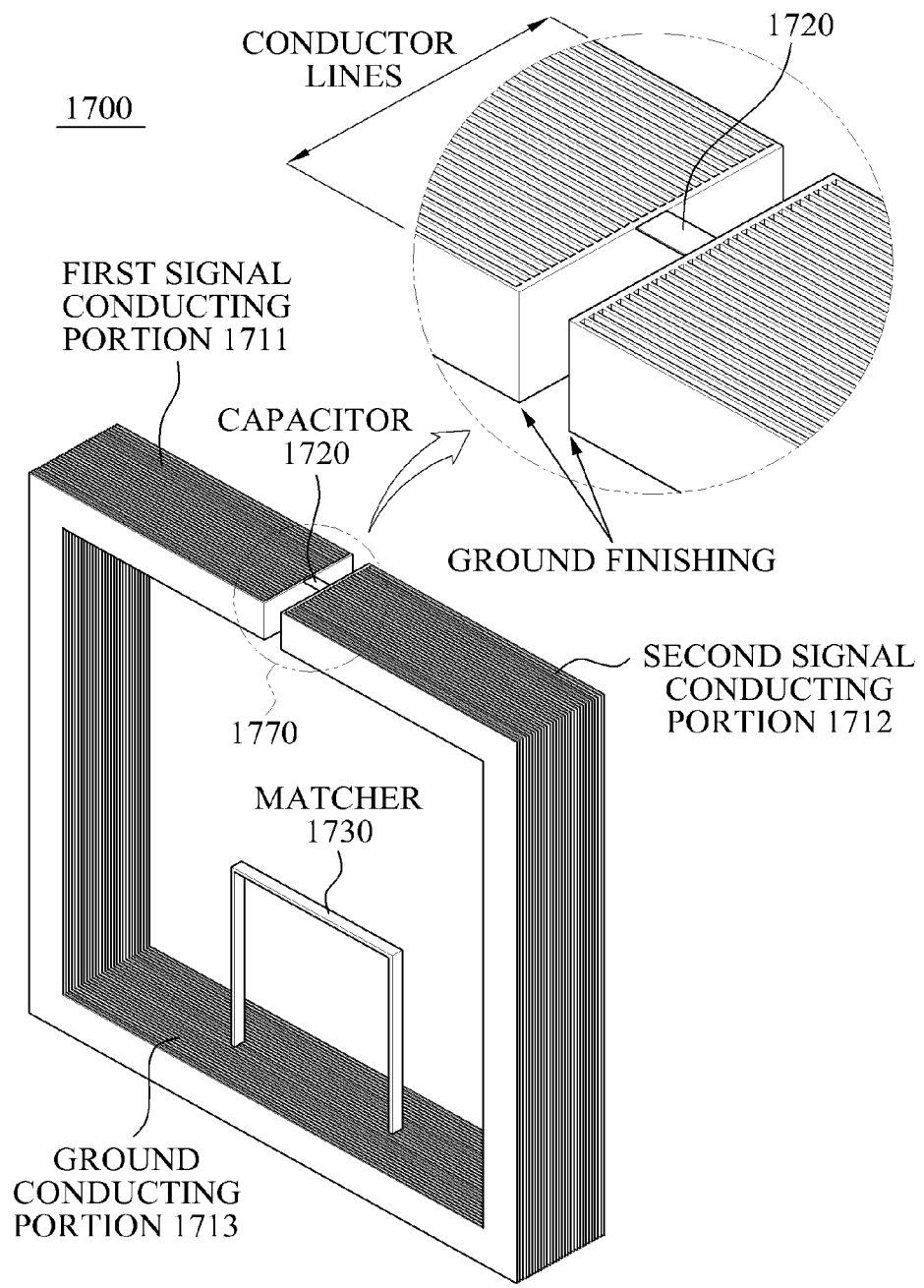

FIG. 17 illustrates a resonator 1700 for a wireless power transmission using a parallel-sheet.

Referring to FIG. 17, the parallel-sheet may be applicable to each of a first signal conducting portion 1711 and a second signal conducting portion 1712 included in the resonator 1700.

Each of the first signal conducting portion 1711 and the second signal conducting portion 1712 may not be a perfect conductor and thus, may have an inherent resistance. Due to this resistance, an ohmic loss may occur. The ohmic loss may decrease a Q-factor and also decrease a coupling effect.

By applying the parallel-sheet to each of the first signal conducting portion 1711 and the second signal conducting portion 1712, it may be possible to decrease the ohmic loss, and to increase the Q-factor and the coupling effect. Referring to the enlarged portion 1770 indicated by a circle, when the parallel-sheet is applied, each of the first signal conducting portion 1711 and the second signal conducting portion 1712 may include a plurality of conductor lines. The plurality of conductor lines may be disposed in parallel, and may be electrically connected (i.e., shorted) at an end portion of each of the first signal conducting portion 1711 and the second signal conducting portion 1712.

When the parallel-sheet is applied to each of the first signal conducting portion 1711 and the second signal conducting portion 1712, the plurality of conductor lines may be disposed in parallel. Accordingly, a sum of resistances having the conductor lines may decrease. Consequently, the resistance loss may decrease, and the Q-factor and the coupling effect may increase.

A capacitor 1720 and a matcher 1730 positioned on the ground conducting portion 1713 may be provided that are similarly constructed as described herein in one or more embodiments.

Figure 18:
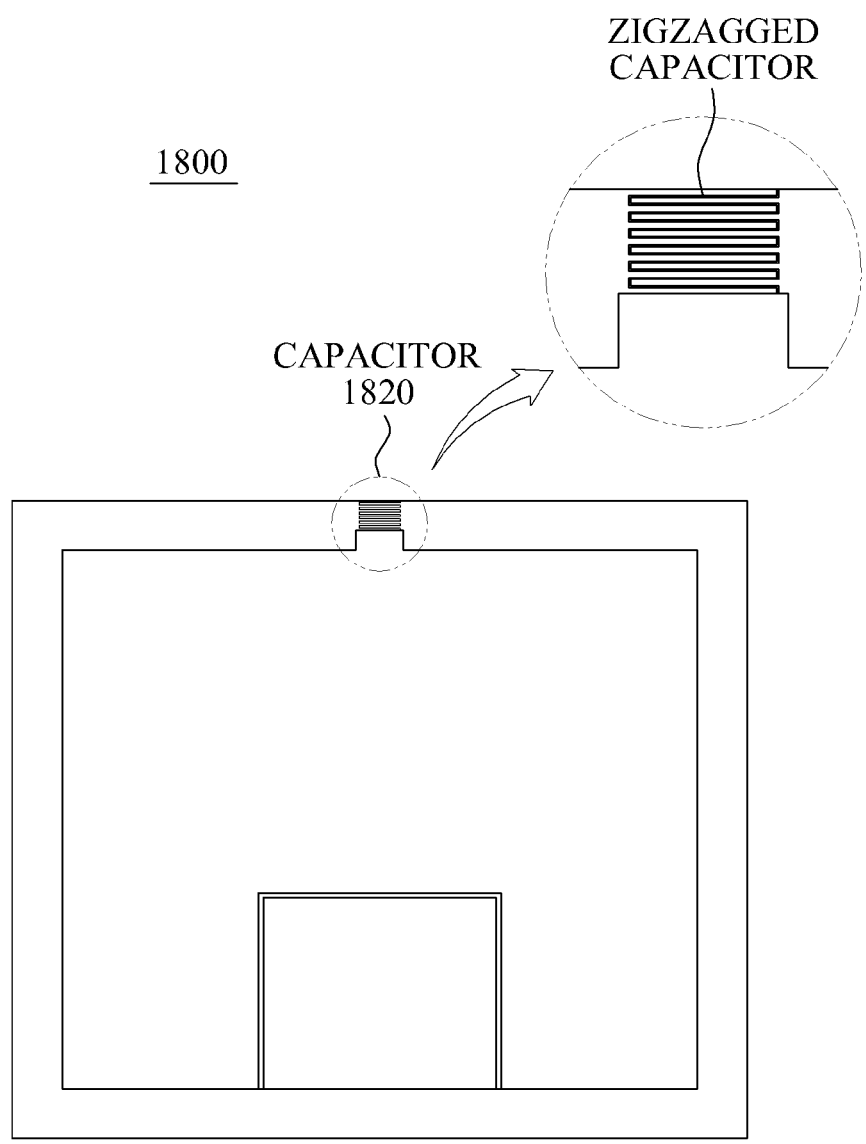

FIG. 18 illustrates a resonator 1200 for a wireless power transmission including a distributed capacitor.

Referring to FIG. 18, a capacitor 1820 included in the resonator 1800 is configured for the wireless power transmission. A capacitor used as a lumped element may have a relatively high equivalent series resistance (ESR). A variety of schemes have been proposed to decrease the ESR contained in the capacitor of the lumped element. According to an embodiment, by using the capacitor 1820 as a distributed element, it may be possible to decrease the ESR. As will be appreciated, a loss caused by the ESR may decrease a Q-factor and a coupling effect.

As shown in FIG. 18, the capacitor 1800 may be configured as a conductive line having the zigzagged structure.

By employing the capacitor 1820 as the distributed element, it may be possible to decrease the loss occurring due to the ESR in some instances. In addition, by disposing a plurality of capacitors as lumped elements, it is possible to decrease the loss occurring due to the ESR. Since a resistance of each of the capacitors as the lumped elements decreases through a parallel connection, active resistances of parallel-connected capacitors as the lumped elements may also decrease whereby the loss occurring due to the ESR may decrease. For example, by employing ten capacitors of 1 pF each instead of using a single capacitor of 10 pF, it may be possible to decrease the loss occurring due to the ESR in some instances.

Figure 19A:
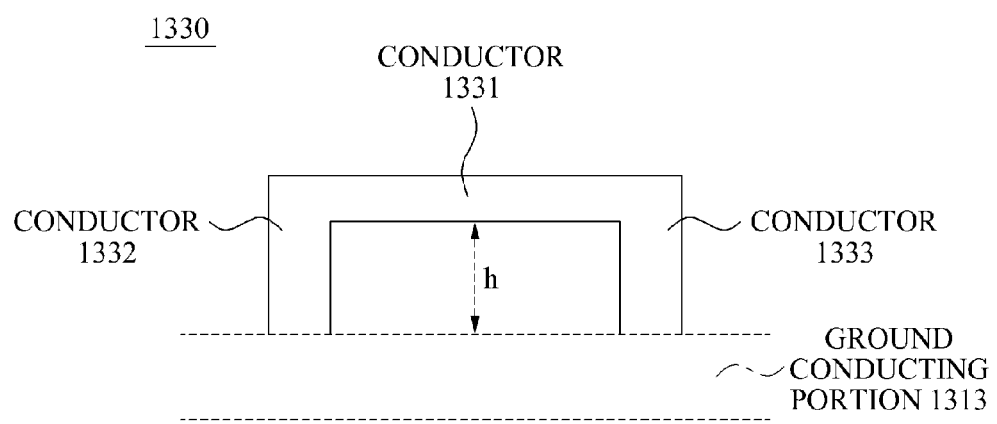

FIG. 19A illustrates one embodiment of the matcher 1930 used in the resonator 1300 provided in the 2D structure of FIG. 13, and FIG. 13B illustrates an example of the matcher 1430 used in the resonator 1400 provided in the 3D structure of FIG. 14.

Figure 19B:
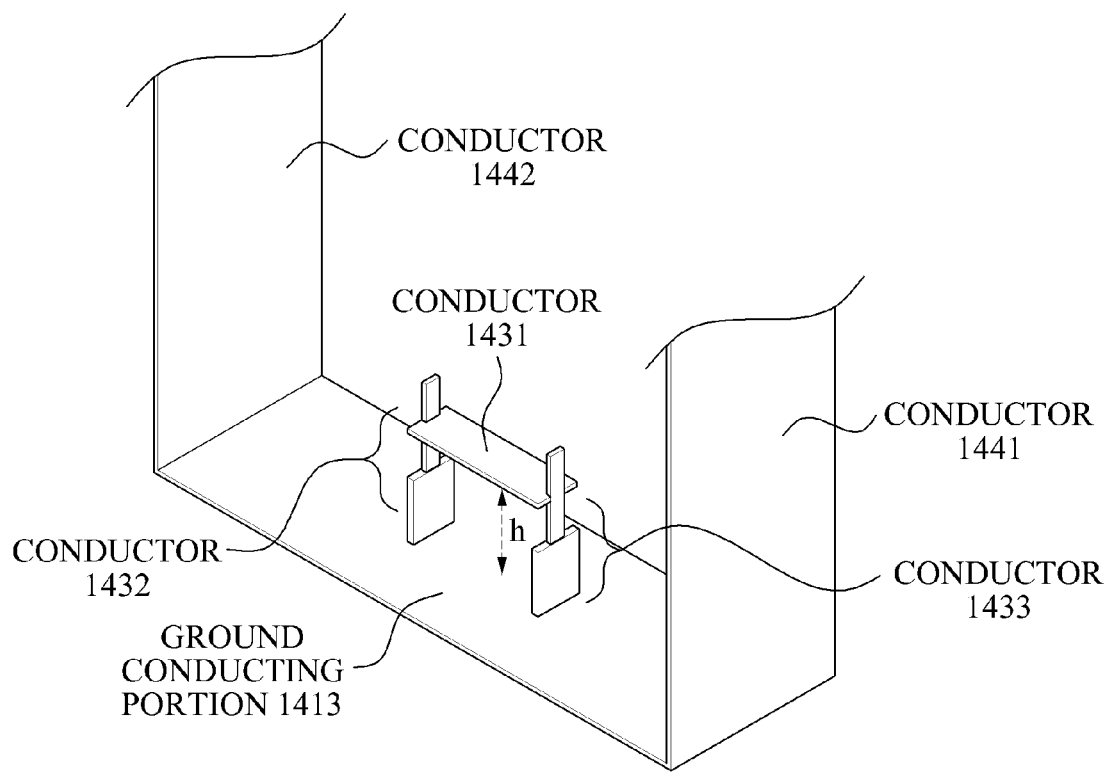

FIG. 19A illustrates a portion of the 2D resonator including the matcher 1330, and FIG. 19B illustrates a portion of the 3D resonator of FIG. 14 including the matcher 1430.

Referring to FIG. 19A, the matcher 1330 may include the conductor 1331, a conductor 1332, and a conductor 1333. The conductors 1332 and 1333 may be connected to the ground conducting portion 1313 and the conductor 1331. The impedance of the 2D resonator may be determined based on a distance h between the conductor 1331 and the ground conducting portion 1313. The distance h between the conductor 1331 and the ground conducting portion 1313 may be controlled by the controller. The distance h between the conductor 1331 and the ground conducting portion 1313 may be adjusted using a variety of schemes. For example, the variety of schemes may include one or more of the following: a scheme of adjusting the distance h by adaptively activating one of the conductors 1331, 1332, and 1333, a scheme of adjusting the physical location of the conductor 1331 up and down, and/or the like.

Referring to FIG. 19B, the matcher 1430 may include the conductor 1431, a conductor 1432, a conductor 1433 and conductors 1441 and 1442. The conductors 1432 and 1433 may be connected to the ground conducting portion 1413 and the conductor 1431. Also, the conductors 1441 and 1442 may be connected to the ground conducting portion 1413. The impedance of the 3D resonator may be determined based on a distance h between the conductor 1431 and the ground conducting portion 1413. The distance h between the conductor 1431 and the ground conducting portion 1413 may be controlled by the controller, for example. Similar to the matcher 1330 included in the 2D structured resonator, in the matcher 1430 included in the 3D structured resonator, the distance h between the conductor 831 and the ground conducting portion 1413 may be adjusted using a variety of schemes. For example, the variety of schemes may include one or more of the following: a scheme of adjusting the distance h by adaptively activating one of the conductors 1431, 1432, and 1433, a scheme of adjusting the physical location of the conductor 1431 up and down, or the like.

In some implementations, the matcher may include an active element. Thus, a scheme of adjusting an impedance of a resonator using the active element may be similar as described above. For example, the impedance of the resonator may be adjusted by changing a path of a current flowing through the matcher using the active element.

Figure 20:
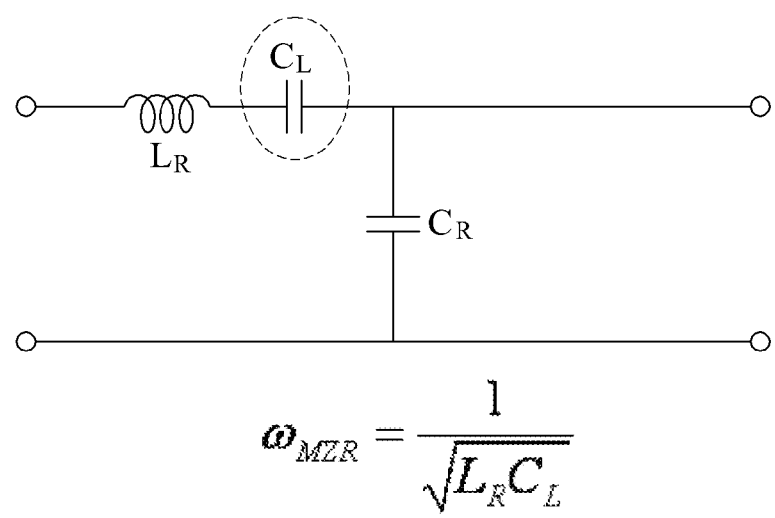
FIG. 20 illustrates one equivalent circuit of a resonator for a wireless power transmission of FIG. 13.

FIG. 20 illustrates one equivalent circuit of the resonator 1300 for the wireless power transmission of FIG. 13.

The resonator 1300 of FIG. 13 for the wireless power transmission may be modeled to the equivalent circuit of FIG. 20. In the equivalent circuit depicted in FIG. 20, $L_R$ denotes an inductance of the power transmission line, $C_L$ denotes the capacitor 1320 that is inserted in a form of a lumped element in the middle of the power transmission line, and $C_R$ denotes a capacitance between the power transmissions and/or ground of FIG. 1300.

In some instances, the resonator 1300 may have a zeroth resonance characteristic. For example, when a propagation constant is "0", the resonator 1300 may be assumed to have $\omega_{MZR}$ as a resonant frequency. The resonant frequency $\omega_{MZR}$ may be expressed by Equation 5.

$$\omega_{MZR} = \frac{1}{\sqrt{L_R C_L}} \quad \text{[Equation 5]}$$

In Equation 5, MZR denotes a Mu zero resonator.

Referring to Equation 5, the resonant frequency $\omega_{MZR}$ the resonator 1300 may be determined by $L_R/C_L$. A physical size of the resonator 1300 and the resonant frequency $\omega_{MZR}$ may be independent with respect to each other. Since the physical sizes are independent with respect to each other, the physical size of the resonator 1300 may be sufficiently reduced.

According to one or more embodiments, in a wireless power transfer, a change of impedance between a source resonator and a target resonator occurring due to a change of power consumption, a change of a resonance coupling condition, a change of an impedance, a change of a location between resonators, and the like may be controlled. In the wireless power transfer, an amount of power loss occurring due to a change of power consumption, a change of a resonance coupling condition, a change of an impedance, a change of a location between resonators, and the like may be reduced. By controlling a change of impedance between a source resonator and a target resonator, a constant voltage and a constant current may be controlled.

The units described herein may be implemented using hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for tracking resonant impedance in a resonance power transfer system, the apparatus comprising:
   a load sensor configured to detect the impedance of a load connected to a target device that receives resonance power;
   a target reflection signal detector configured to detect a reflection signal corresponding to the resonance power;
   a target impedance tracking unit configured to track the resonant impedance by adjusting a determination factor of a resonant frequency; and
   a target control unit configured to control the tracking of the resonant impedance based on whether there is a change of the impedance of the load, the reflection signal is detected, or both.

2. The apparatus of claim 1, wherein the load sensor detects the change of the impedance of the load by sensing a voltage applied to the load and an amount of current flowing to the load.

3. The apparatus of claim 1, wherein the target reflection signal detector detects the reflection signal through a coupler.

4. The apparatus of claim 1, wherein the target impedance tracking unit includes one or more capacitors and a switch configured to adjust the determination factor of the resonant frequency by switching the one or more capacitors.

5. The apparatus of claim 4, wherein the target control unit acquires an amount of the change of the impedance of the load, and determines a switching direction of the switch based on the amount of the change of the impedance.

6. An apparatus for tracking resonant impedance in a resonance power transfer system, the apparatus comprising:
   a source reflection signal detector configured to detect a reflection signal corresponding to resonance power transmitted to a target device;
   a target detector configured to detect a change of impedance with respect to the target device;

a source impedance tracking unit configured to track resonant impedance by adjusting a determination factor of resonant frequency; and a source control unit configured to control the tracking of the resonant impedance based on whether at least one of the reflection signal and the change of the impedance with respect to the target device is detected.

7. The apparatus of claim 6, wherein the source reflection signal detector detects the reflection signal through a coupler.

8. The apparatus of claim 6, wherein the target detector detects the change of the impedance with respect to the target device based on the reflection signal and an amount of the resonance power transmitted to the target device.

9. The apparatus of claim 6, wherein the source impedance tracking unit includes one or more capacitors and a switch configured to adjust the determination factor of the resonant frequency by switching the one or more capacitors.

10. The apparatus of claim 9, wherein the source control unit acquires an amount of the change of the impedance with respect to the target device, and determines a switching direction of the switch based on the amount of the change of the impedance.

11. A method of tracking resonant impedance of a target device in a resonance power transfer system, the method comprising:

detecting an impedance of a load connected to the target device receiving resonance power and a change of the impedance of the load;

performing tracking of resonant impedance based on whether the change of the impedance is detected and an amount of the change of the impedance; and controlling the tracking of the resonant impedance based on whether a reflection signal corresponding to the resonance power is detected.

12. The method of claim 11, wherein the detecting of the change of the impedance of the load comprises detecting the change of the impedance of the load by detecting a voltage applied to the load and an amount of current flowing to the load.

13. The method of claim 11, wherein the performing of the tracking of the resonant impedance comprises:

generating a control signal associated with the amount of the change of the impedance; and changing a determination factor of a resonant frequency based on the control signal.

14. The method of claim 13, wherein the determination factor of the resonant frequency corresponds to a capacitance of a target resonator, and the control signal corresponds to information about an increase or a decrease of the capacitance.

15. A method of tracking resonant impedance of a source device in a resonance power transfer system, the method comprising:

detecting a change of impedance with respect to a target device that receives resonance power;

performing tracking of resonant impedance based on whether the change of the impedance with respect to the target device is detected and an amount of the change of the impedance; and controlling tracking of the resonant impedance based on whether a reflection signal corresponding to the resonance power is detected.

16. The method of claim 15, wherein the change of the impedance with respect to the target device is detected based on the reflection signal and an amount of the resonance power transmitted to the target device.

17. The method of claim 15, wherein the performing of tracking of the resonant impedance comprises:

generating a control signal associated with the amount of the change of the impedance; and changing a determination factor of a resonant frequency based on the control signal.

18. The method of claim 15, wherein the determination factor of the resonant frequency corresponds to a capacitance of a target resonator, and the control signal corresponds to information about an increase or a decrease of the capacitance.

* * * * *